United States Patent [19]

Kuznetsov et al.

[11] Patent Number: 5,483,649
[45] Date of Patent: Jan. 9, 1996

[54] PERSONAL COMPUTER SECURITY SYSTEM

[75] Inventors: Oleg V. Kuznetsov; Dmitry A. Luchuk, both of Kiev, Ukraine

[73] Assignee: YBM Technologies, Inc., Hatboto, Pa.

[21] Appl. No.: 269,591

[22] Filed: Jul. 1, 1994

[51] Int. Cl.[6] .................................................... G06F 12/14
[52] U.S. Cl. ........................................................ 395/186
[58] Field of Search .................................. 395/575, 425; 380/4; 364/286.4, 286.5

[56] References Cited

U.S. PATENT DOCUMENTS

| | | | |
|---|---|---|---|
| 4,588,991 | 5/1986 | Atalla | 340/825.31 |
| 4,652,990 | 3/1987 | Pailen et al. | 364/200 |
| 4,742,447 | 5/1988 | Duvall et al. | 364/200 |
| 4,787,027 | 11/1988 | Prugh et al. | 364/200 |
| 5,113,518 | 5/1992 | Durst, Jr. et al. | 395/550 |
| 5,144,659 | 9/1992 | Jones | 380/4 |
| 5,263,147 | 11/1993 | Francisco et al. | 395/425 |
| 5,289,540 | 2/1994 | Jones | 380/4 |

*Primary Examiner*—Robert W. Beausoliel, Jr.
*Assistant Examiner*—Stephen C. Elmore
*Attorney, Agent, or Firm*—Caesar, Rivise, Bernstein, Cohen & Pokotilow, Ltd.

[57] ABSTRACT

A personal computer subsystem, having a hardware module and protection software, is designed to protect files on a personal computer from inadvertent or intentional distortion, and can be used to protect personal computers from programs known as computer viruses. The hardware module is connected to the personal computer system busses and the software has a kernel which ensures the security of one access path to the hard disk controller and utilizes the above-mentioned module to block other access paths to the hard disk controller. The only permitted access path to the hard disk controller is a path which uses the computer's operating system, modular device driver and basic input/output system. All other access paths to the hard disk controller are interpreted by the personal computer subsystem as forbidden.

38 Claims, 30 Drawing Sheets

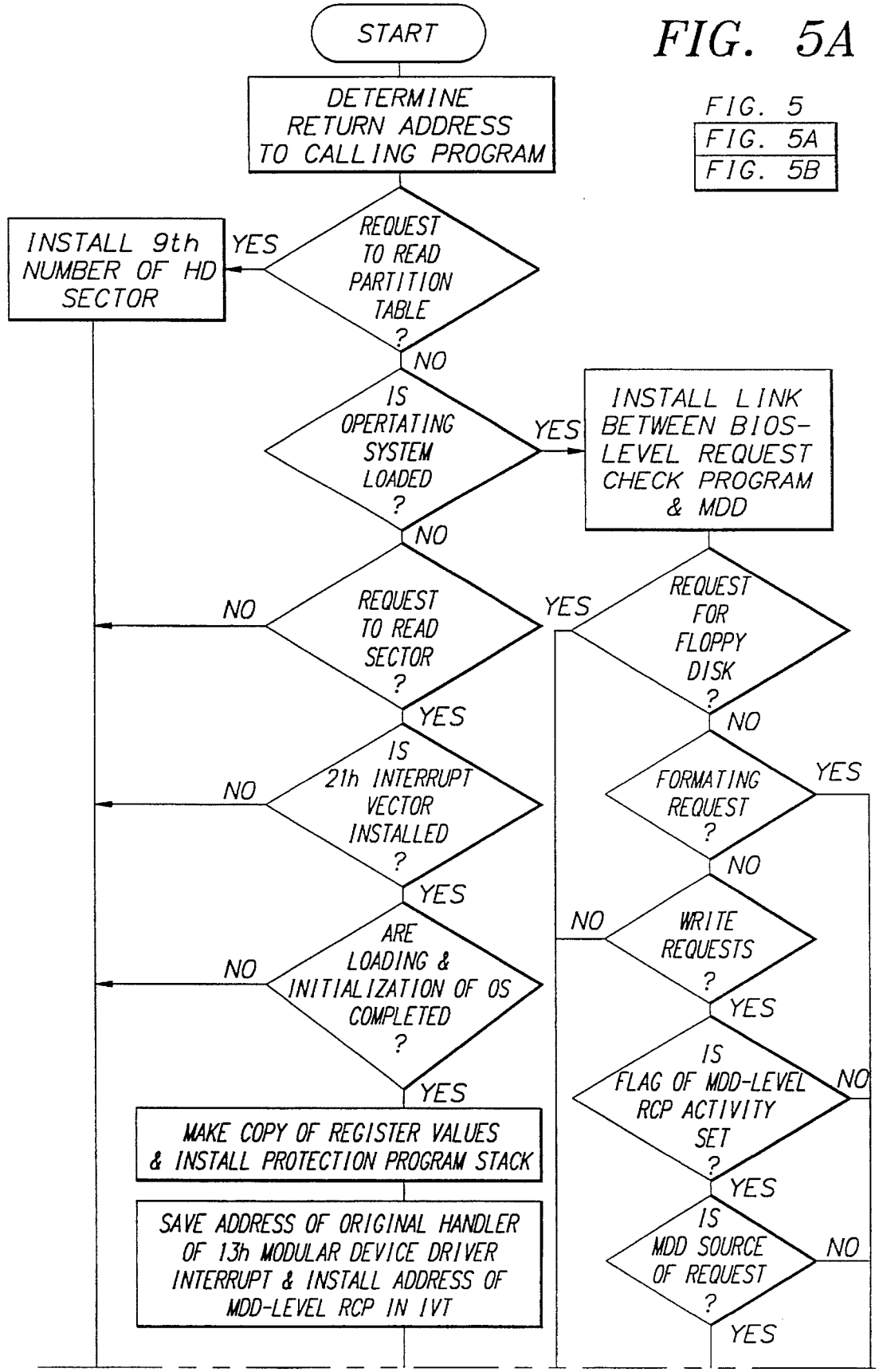

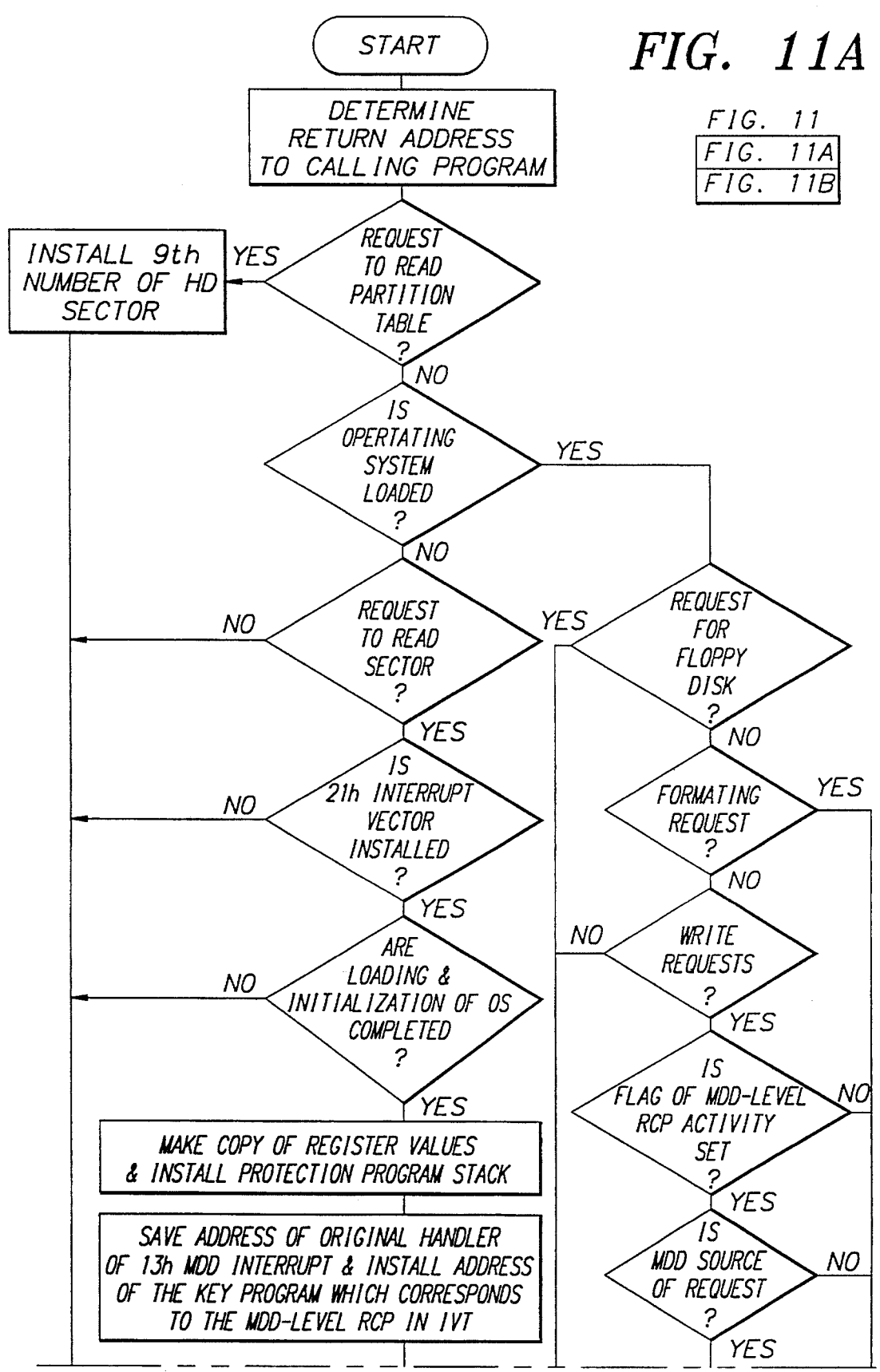

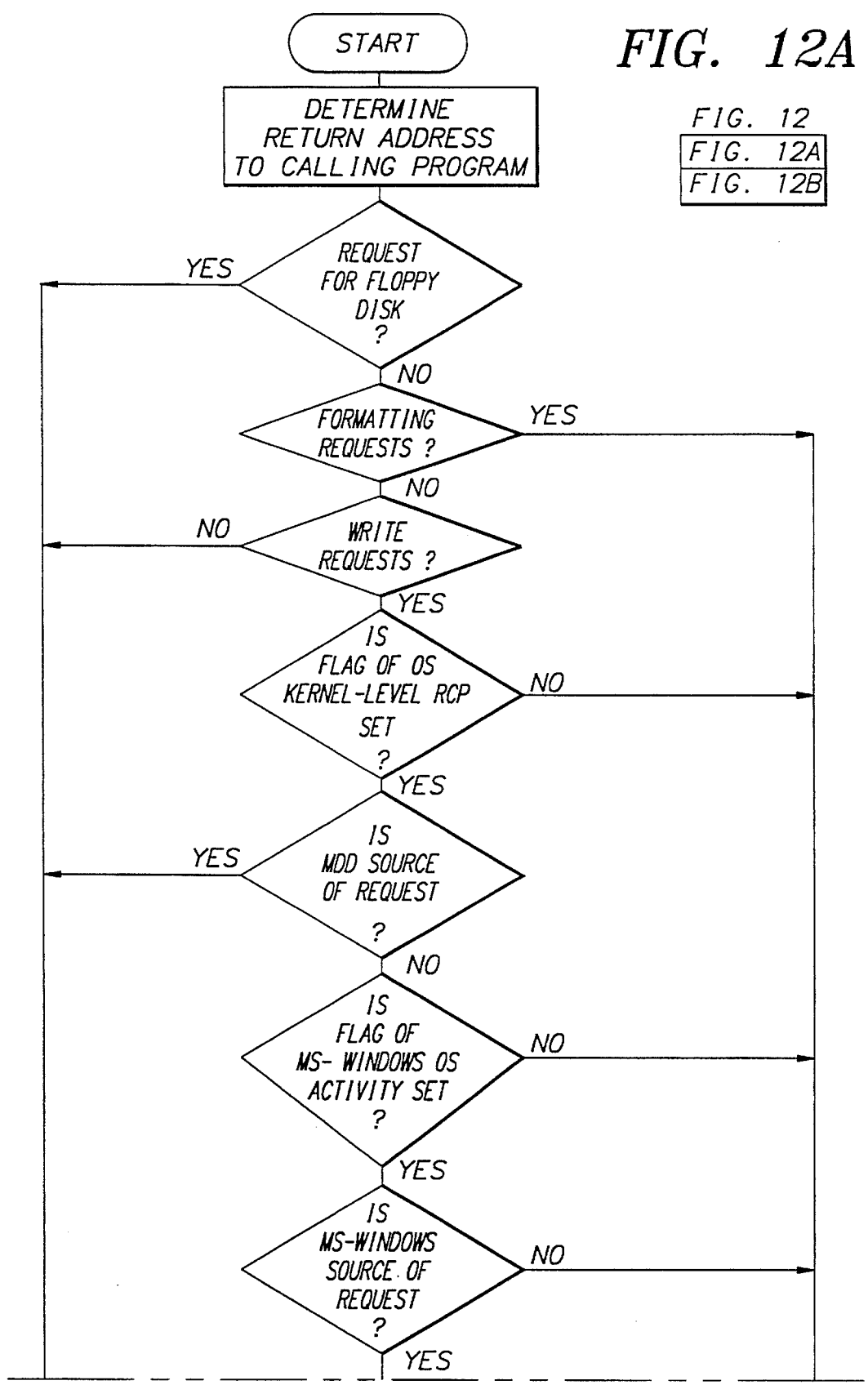

PERSONAL COMPUTER SECURITY SYSTEM

FIELD OF THE INVENTION

The invention pertains to methods of protecting information on a hard disk, and can be used to protect files from inadvertent or intentional distortion. In particular, this invention concerns a personal computer security system.

BACKGROUND OF THE INVENTION

The most progressive approach to using personal computers for collective information processing is to combine personal computers into local area networks (LANs). The establishment of a LAN facilitates information gathering and permits the efficient use of memory resources. However, LANs also provide favorable conditions for the rapid propagation of programs known as computer viruses and the mass distortion of information stored on personal-computer disks. Computer viruses which distort information for purposes of causing economic loss to the information owner are particularly dangerous. The disastrous losses caused by computer viruses and the continually increasing number of viruses have brought about the need for information security subsystems designed to identify and eliminate viruses. However, despite the many different security subsystems, computer crime statistics show that computer viruses present no less of a threat than before, and are still capable of causing serious losses to personal computer users. The risk for users of personal computers connected to a LAN is considerably higher than the risk for users of stand-alone personal computers. Therefore, protection from computer viruses is an urgent problem for stand-alone personal computers, and is especially important for personal computers used in LANs.

A review of prior security subsystems for personal computers shows that these subsystems are usually based on the use of programs which protect files from inadvertent or intentional distortion. Depending on the hardware used to support the protection programs, these security subsystems are either software subsystems or software-hardware subsystems.

Software subsystems do not have any dedicated hardware, and all the resources needed to support the protection programs are borrowed from the main personal computer. Software subsystems quickly became popular among personal computer users and are now the main means for virus protection. However, experience with software subsystems showed that these subsystems are easily thwarted, and thus they are not very promising in the continuing war against viruses. Therefore, the main trend in the development of security subsystems is toward software-hardware security subsystems.

Software-hardware security subsystems include dedicated hardware and borrow some resources from the main personal computer to support the protection programs. A typical example of this type of subsystem is the D.D.C. subsystem (USA), which provides virus diagnostics before the operating system is loaded into the main memory of the personal computer. (Multimillionaire Pickens finances antivirus firm, EDV-Aspekte, No. 9, p. 46, 1992.) The D.D.C. subsystem is an external board which is inserted into one of the expansion slots of the personal computer. The protection program, which is resident in the external board ROM, receives control after the personal computer is reset and eliminates viruses on the hard disk before the operating system is loaded. A similar subsystem known as Thunderbyte was developed by the Dutch firm Esass. Both systems have the advantages of simple hardware supporting the protection program and relatively low cost. However, in these subsystems the protection program is not directly involved with hard disk access. As a result, these subsystems are not capable of preventing inadvertent or intentional distortion of hard disk files.

Subsystems which execute protection programs while the personal computer is in use provide protection against inadvertent or intentional distortion of files.

The following constitute various examples of patents disclosing computer security systems.

In British Patent Application 2248324A (Data Security in a Computer Network), there is disclosed the use of a microcomputer in a computer network which permits shared access to stored data. The microcomputer comprises a security circuit which controls the operation of an address buffer according to a table of access conditions retrieved from non-volatile memory in response to an input password (which can be one of five assigned security levels), there being one of three access conditions ([1] read/write disable, [2] read enable/write disable and [3] read and write enable) for each block of memory addresses. The relevant memory address block is identified by reading of a memory map that has been created and stored by the security circuit in the non-volatile memory. Therefore, portions of a computer's memory are available to selected users and of those users only certain individuals have the ability to modify those portions of memory.

In European Patent Application 0268138A2 (Implementing Privilege on Microprocessor Systems for Use in Software Asset Protection), there is disclosed a software protection system that uses two microprocessors, an application processor and a supervisor processor, to form a dual privilege (high or low) coprocessor protection system. To that end, the application processor only executes the application code and has no input/output capability. The supervisor processor, which controls the application processor, retrieves all of its instructions from a secure ROM which cannot be modified by any external devices. Therefore, all input/output to the application processor is by way of the supervisor processor. A high privilege read only memory and a secure random access memory are enabled only in response to dedicated control signals from the supervisor processor. A secure random access memory is provided for storage of sensitive information such as decryption keys. The coprocessor implements a low privilege level of operation for the purpose of executing protected software which is first decrypted under the control of the supervisor processor and then stored in the application processor random access memory. The coprocessor is also capable of high privilege operation either by the supervisor processor alone or with the supervisor processor controlling the application processor and its associated high privilege read only memory.

In European Patent Application 0407060A2 (Method of Providing Mandatory Secrecy and Integrity File Security in a Computer System) there is disclosed a method for ensuring access to files of a computer system only to computer processes properly authorized for access. A separate security label is associated with each file and process of the system and defines authorized security classes pertaining to the associated file or process. Each security label contains information describing authorizations based on data secrecy and data integrity. A comparison is made on an attempted access of a file by a process of the security label associated with the process and the security label associated with the file. A verification is made based on the comparison that the process is authorized to access the file. The verification as to both secrecy and integrity aspects is accomplished in the single verification step.

In European Patent Application 0458718A2 (Method for Controlling Public Access to a Plurality of Data Objects within a Data Processing System), there is disclosed a method for efficiently controlling public access to a plurality of data objects stored within a data processing system. An access control profile is associated with each data object. Each access control profile preferably includes: an authorization parameter listing the identity of a particular user and the authorization level granted to that user; a shared authorization parameter listing the identities of a plurality of users and the authorization level granted to each listed user; and, a public authorization parameter listing the authorization level granted to each user not specifically set forth within the access control profile. A single "public" user identity is then defined for all users not specifically set forth within the access control profile, and that identity, as well as a public authorization level for an entire group of data objects, is listed within a single shared authorization parameter. That shared authorization parameter is then placed within the access control profile of each data object within the group. Thereafter, a reference to the shared authorization parameter is placed within the public authorization parameter of each data object within the group so that public access to the entire group of data objects may be centrally controlled by means of a single shared authorization parameter.

In British Patent Application 2242295A (Access Control in a Data Processing System), there is disclosed a method of controlling access in a data processing system by way of a set of attributes defining targets that may be accessed and for accessors that may access these targets. A set of access security classes is then defined in terms of these attributes or other classes. Each class has a set of allowable operations associated with it. Each target is assigned a classification comprising one of the classes and a set of allowed operations. Each entrant is assigned an authority consisting of one of the classes and a set of allowed operations. An entrant is allowed to access a target only if there is a common sub-class contained in both the entrant's authority and in the target's classification and if the required operation is defined for that subclass and appears in both the entrant's authority and in the target's classification.

In German Published Application No. 403444A1 (Data-Shielding Workplace Computer), there is disclosed a data-shielding workplace computer with working memory, mass storage, processor, peripherals, and a system bus connecting these system components to each other. Data is stored in encrypted form in the mass storage devices. A security computer is provided, which has an additional processor, additional working memory, and an additional system bus to connect these components to each other and which is compatible with the workplace computer; a bus coupler is provided in order for the two system busses to be connected and disconnected. Furthermore, requests for data from mass storage are processed under the sole command of the security computer. Cryptologic processing of these requests is accomplished exclusively by the security computer; monitoring units are provided in order for the system bus of the workplace computer to monitor access to unallowed addresses and to the security-relevant hardware ports of the mass storage units; an emergency stop is implemented on the workplace computer whenever unallowed access is attempted.

In International Publication No. WO 90/13084 (Computer File Protection System), there is disclosed a module comprising an auxiliary memory and a controller which are connected to the system bus of a computer. The auxiliary memory is used to store supervisor-assigned criteria for secure access to the files. The controller is based on a digital processor, and thwarts access attempts which do not conform to the established security criteria. During the installation process, the controller creates a protected area on the disk for the storage of file signatures. If there is any deviation from the established criteria for secure access to files, the subsystem prevents further use of the computer. However, such a functional-diagnosis subsystem tends to use expensive hardware and relatively high overall cost, making such a security system unavailable to many personal computer users.

In addition, none of the above disclosures provides the operator with a personal computer having hidden storage of security programs in conjunction with a hardware module that establish a single permitted path between the application program and the hard disk controller that can be monitored and/or obstructed when unauthorized access is attempted to, or a computer virus attempts to write to, the hard disk.

OBJECTS OF THE INVENTION

Accordingly, it is the general object of this invention to provide apparatus which address the aforementioned needs.

It is a further object of this invention to provide hard disk protection of a personal computer without having to use encryption/de-cryption codes.

It is still a further object of this invention to provide security programs that are loaded and operable within the personal computer before the basic input/output system is loaded and operable.

It is yet a further object of this invention to provide internal software protection for networked and non-networked computers for the processing of security-sensitive data.

It is still yet another object of this invention to provide a personal computer security system having a hardware portion that is not complex.

It is still yet a further object of this invention to provide a personal computer security system that provides a close relationship between the hard disk access and the execution phase of the protection software.

SUMMARY OF THE INVENTION

These and other objects of the instant invention are achieved by providing a system of protecting data stored on the hard disk of a personal computer from inadvertent or intentional distortion. The personal computer has a central processing unit and memory, a hard disk controller having a command register, a hard disk, an address bus, a data bus, a control bus, and peripheral devices coupled thereto. The memory comprises a basic input/output system, a modular device driver, an operating system kernel, an application program and an interrupt vector table containing original interrupt handlers. The system provides means for establishing a single access path to the hard disk controller from the application program.

DESCRIPTION OF THE DRAWINGS

Other objects and many of the attendant advantages of this invention will be readily appreciated as the same becomes better understood by reference to the following detailed description when considered in connection with the accompanying drawings wherein:

FIGS. 5A–5B is a flow chart of the BIOS-level request check program;

FIGS. 11A–11B is a flow chart of the BIOS-level request check program;

FIGS. 12A–12B is a flow chart of the modular device driver-level request check program;

DESCRIPTION OF THE INVENTION

Figure 1:
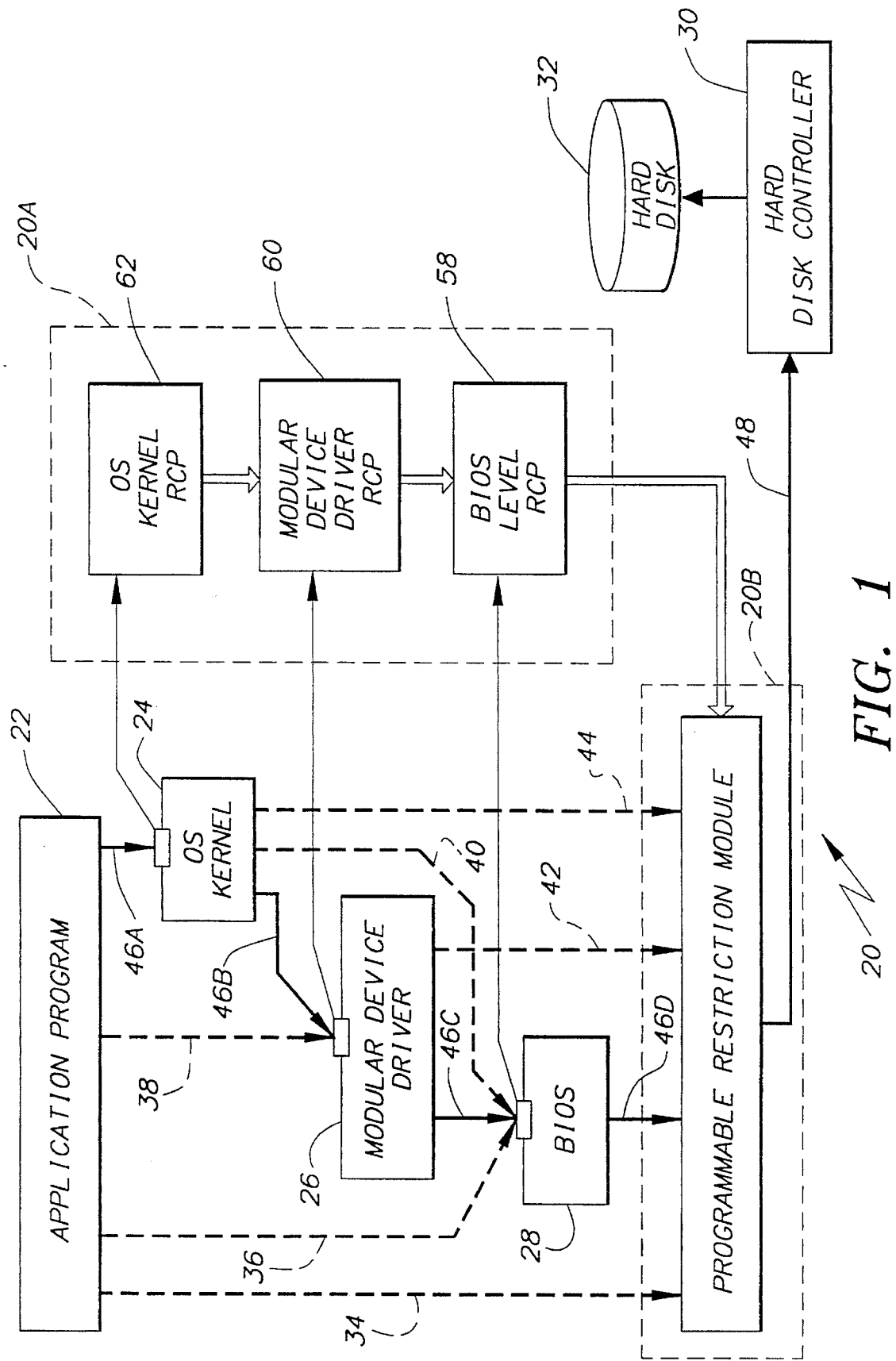
FIG. 1 is an interface diagram of the invention with the personal computer system.

Referring now in detail to the various figures of the drawing wherein like reference characters refer to like parts, there is shown at 20 in FIG. 1, the file protection subsystem which comprises protection software 20A and a hardware module 20B, known as the programmable restriction module (PRM) 20B. The protection software 20A comprises a set of protection programs, the kernel of which uses the PRM 20B to restrict the set of possible access paths to the hard-disk controller, as discussed below.

A conventional personal computer system basically comprises application program software 22, operating system (OS) software 24, modular device driver (MDD) software 26 and basic input/output system (BIOS) software 28 that have access to the computer's hard disk controller 30 (and, thereby, the hard disk 32 itself) via a set of access paths 34–48.

The file protection subsystem 20 is interfaced with the personal computer system to monitor the security of requests involving one access path 46A–46D to the hard-disk controller 30, and prevents the servicing of requests involving other access paths 34–44 to the hard-disk controller 30. The only permitted access path 46A–46D to the hard-disk controller 30 is an access path using the BIOS 28. All other access paths 34–44 to the hard-disk controller 30 are interpreted as forbidden.

Figure 2:
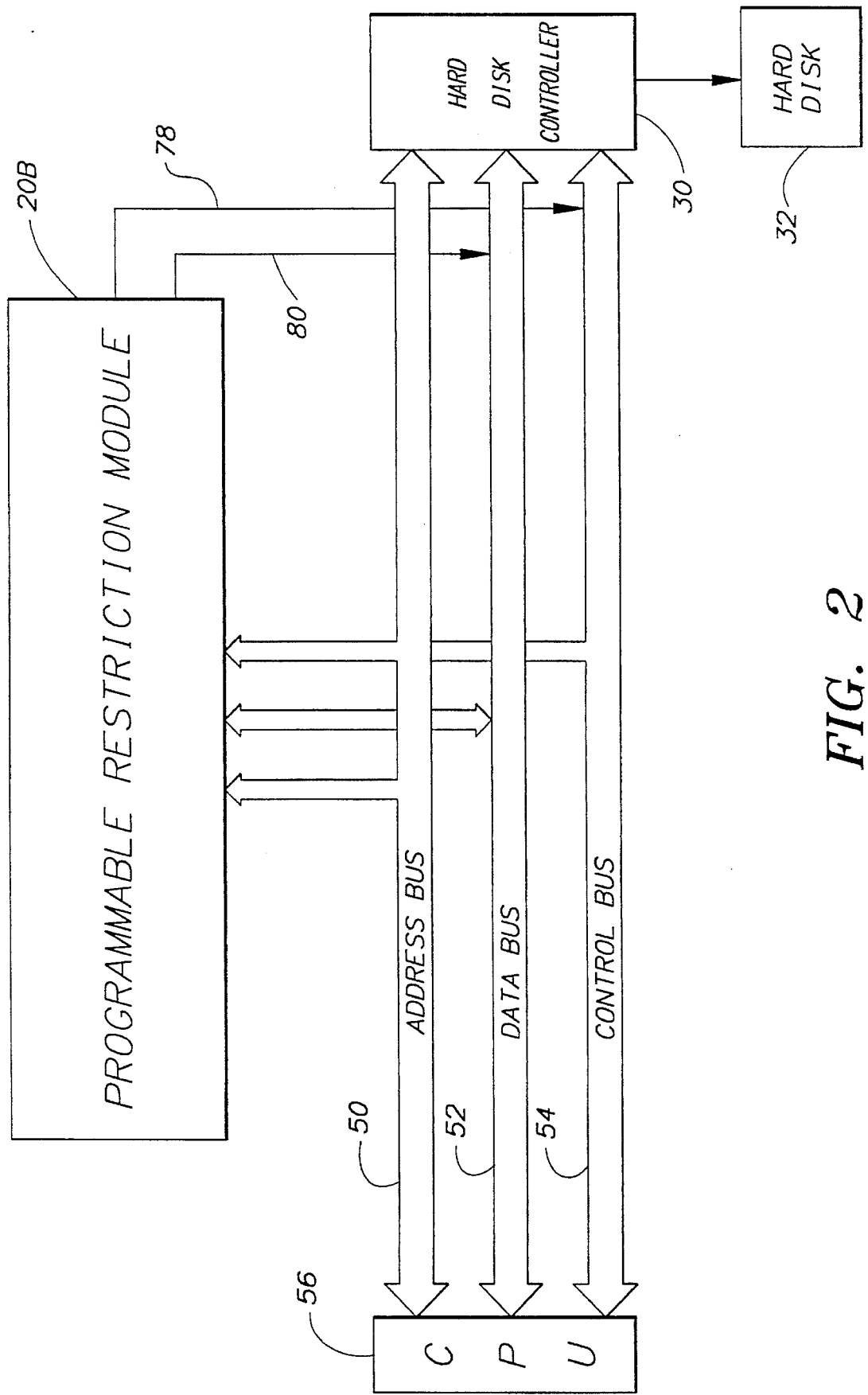
FIG. 2 is an interface diagram of the programmable restriction module and the computer hardware.

The PRM 20B is an external board connected to the personal computer system address bus 50, data bus 52 and control bus 54 (FIG. 2). The PRM 20B has two operating modes. In the first (passive) operating mode, the PRM 20B does not affect central processing unit 56 (CPU) access to the peripheral devices. In the second (active) operating mode, the programmable restriction module monitors the bus cycles involving CPU 56 access to the peripheral devices and produces a blocking signal in the bus cycle of data output to the data register of the hard-disk controller 30, thereby preventing the completion of the current bus cycle by removing availability from the CPU 56.

The protection software 20A consists of a protection initialization program, a protection kernel, and a protection control program. The hard disk 32 is used to store the protection software 20A. The protection control program is stored on the hard disk 32 as an ordinary file. The first eight sectors of the hard disk 32 are used to store the protection initialization program and the protection kernel. The protection initialization program is stored in the first sector of the hard disk 32, while the master boot record is transferred from the first sector and placed in the ninth sector of the hard disk 32. As a result, the first program which receives control when the OS 24 is loaded is the protection initialization program.

The protection kernel has a three-level configuration and consists of three components: a program 58 which checks requests at the BIOS level (FIGS. 5A–5B), a program 60 which checks requests at the modular device driver level (MDD, FIGS. 6A–6B), and a program 62 which checks requests at the OS kernel level (FIGS. 7A–7F). Each component of the protection kernel uses a specific link with an individual component of the OS 24 or BIOS 28. The OS kernel-level request check program 62 is linked with the original handler of the 21h OS interrupt (MS-DOS System Functions) by removing from the OS kernel the call of the 82h function (Network Redirect) of the 2Ah OS program interrupt (Networks Interface) and inserting the call for the OS kernel-level request check program 62 into the OS kernel. The MDD-level request check program 60 uses a link established by replacing the address of the original handler of the 13h interrupt of the modular device driver in the interrupt vector table (IVT) with the address of the modular device driver-level request check program 60. The BIOS-level request check program 58 uses a link established by replacing the address of the original handler of the 13h BIOS interrupt used by the modular device driver to call the program with the address of the BIOS-level request check program 58. In addition, the BIOS-level request check program 58 uses a link established by replacing the address of the original handler of the 13h BIOS program interrupt in the interrupt vector table with the address of the BIOS-level request check program 58, thus providing an auxiliary link which is used during loading of the OS 24.

The protection initialization program loads the protection kernel into the main memory and establishes a link between the BIOS-level request check program 58 and the original handler of the 13h BIOS interrupt. After this link is established, the protection initialization program loads the master boot record into the main memory and transfers control to the master boot record.

During the OS 24 loading process, the BIOS-level request check program 58 monitors the process and establishes, after loading is completed, a link between the MDD-level request check program 60 and the original handler of the 13h modular device driver interrupt. The BIOS-level request check program 58 establishes a link between the modular device driver and the BIOS-level request check program. Further functioning of the protection kernel is initiated by information requests from the application program 22, and depends on the type of request. The protection kernel supplements the file protection measures performed by the OS kernel, and grants the protection control program the privilege of changing the status of files.

Figure 17:
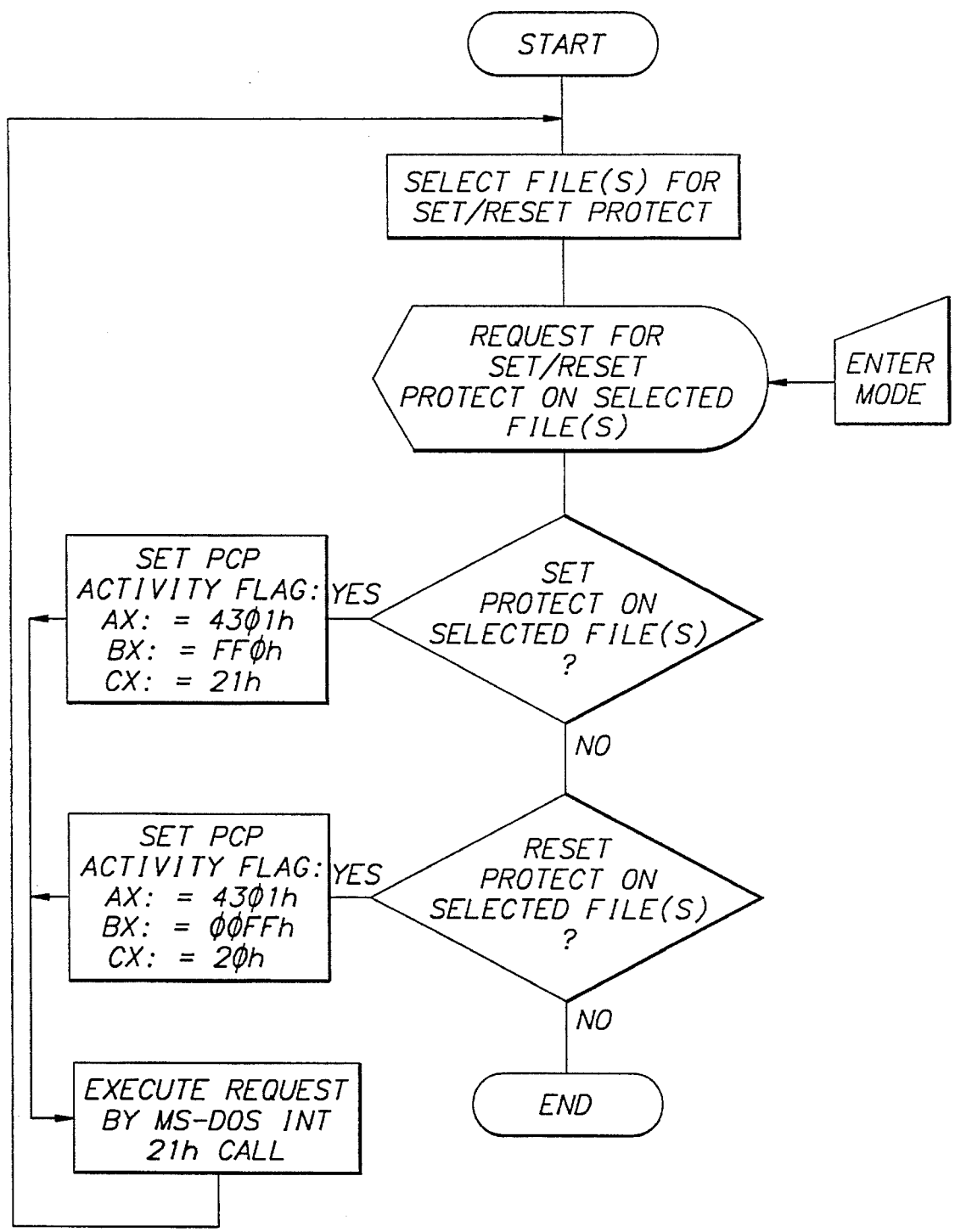
FIG. 17 is an exemplary protection control program.

The purpose of the protection control program is to change file attributes. It is the only application program 22 that has the privilege of changing the status of files. An example of a protection control program is given in FIG. 17. To use this privilege, the protection control program sets its own activity flag when requesting a change of file attribute. The activity flag of the privileged program is checked by the OS kernel-level request check program 62 (FIGS. 7A–7F).

Figure 7A:
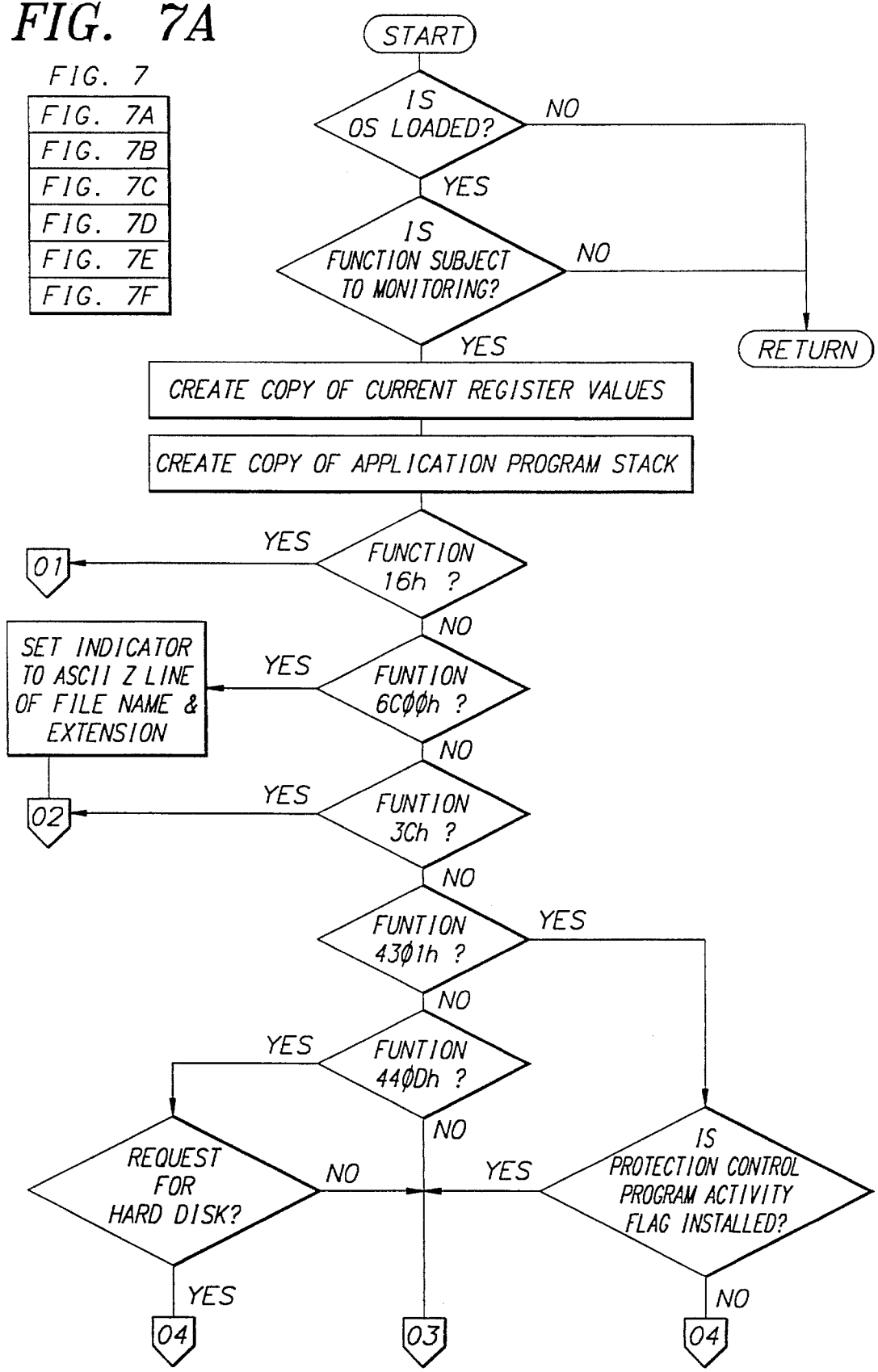
FIGS. 7A–7F is a flow chart of the OS kernel-level request check program.
Figure 7B:
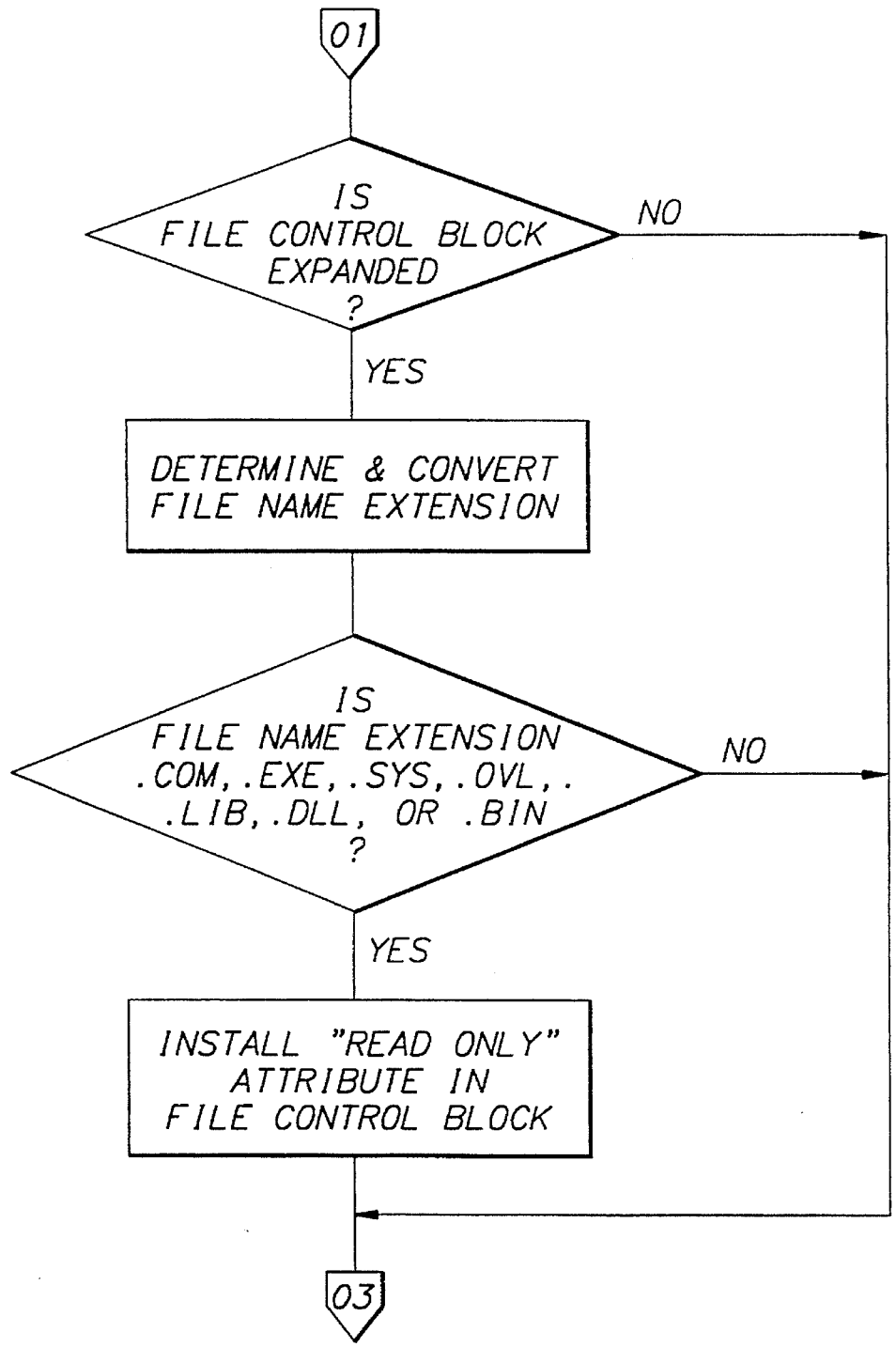
Figure 7C:
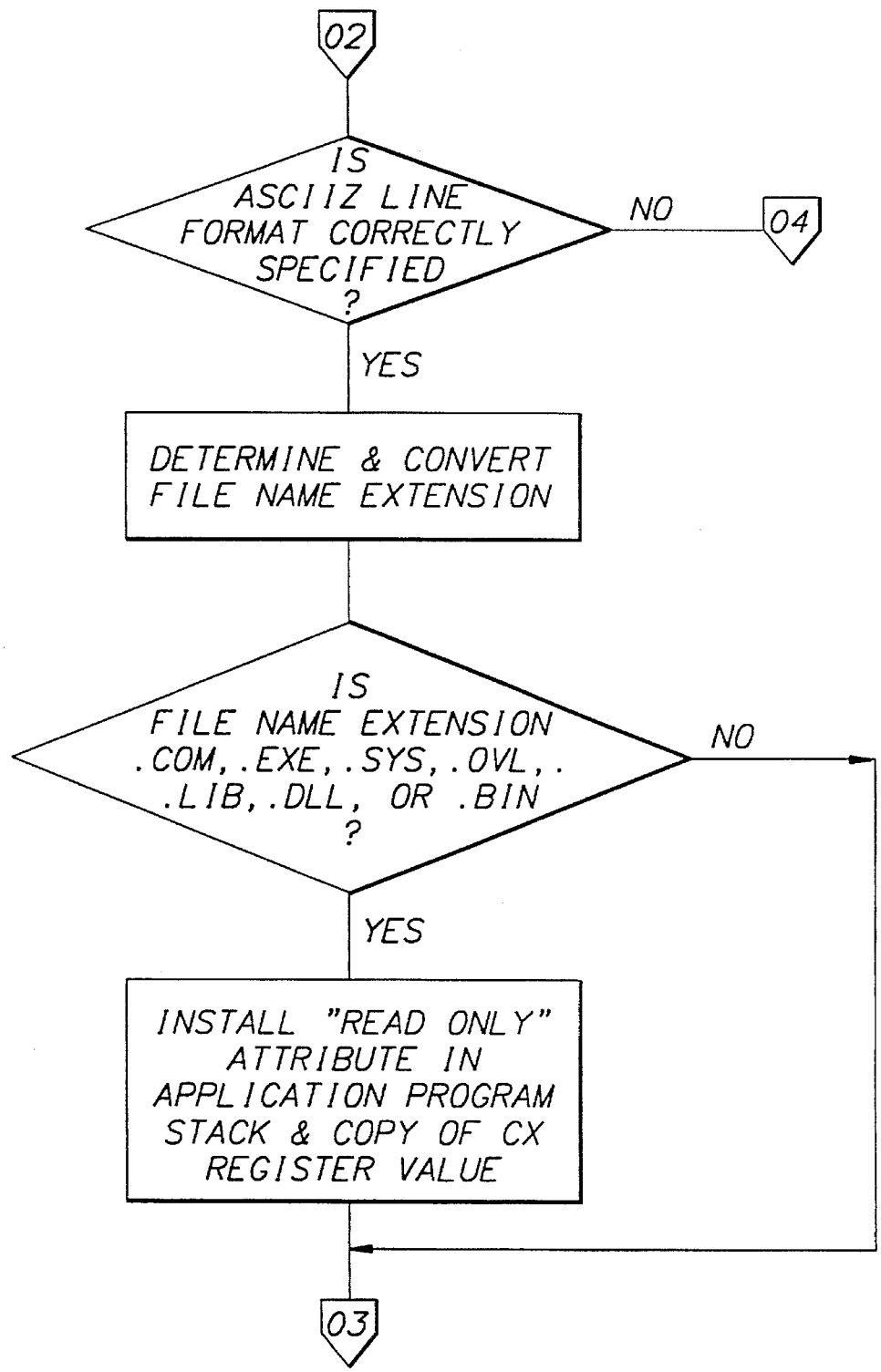
Figure 7D:
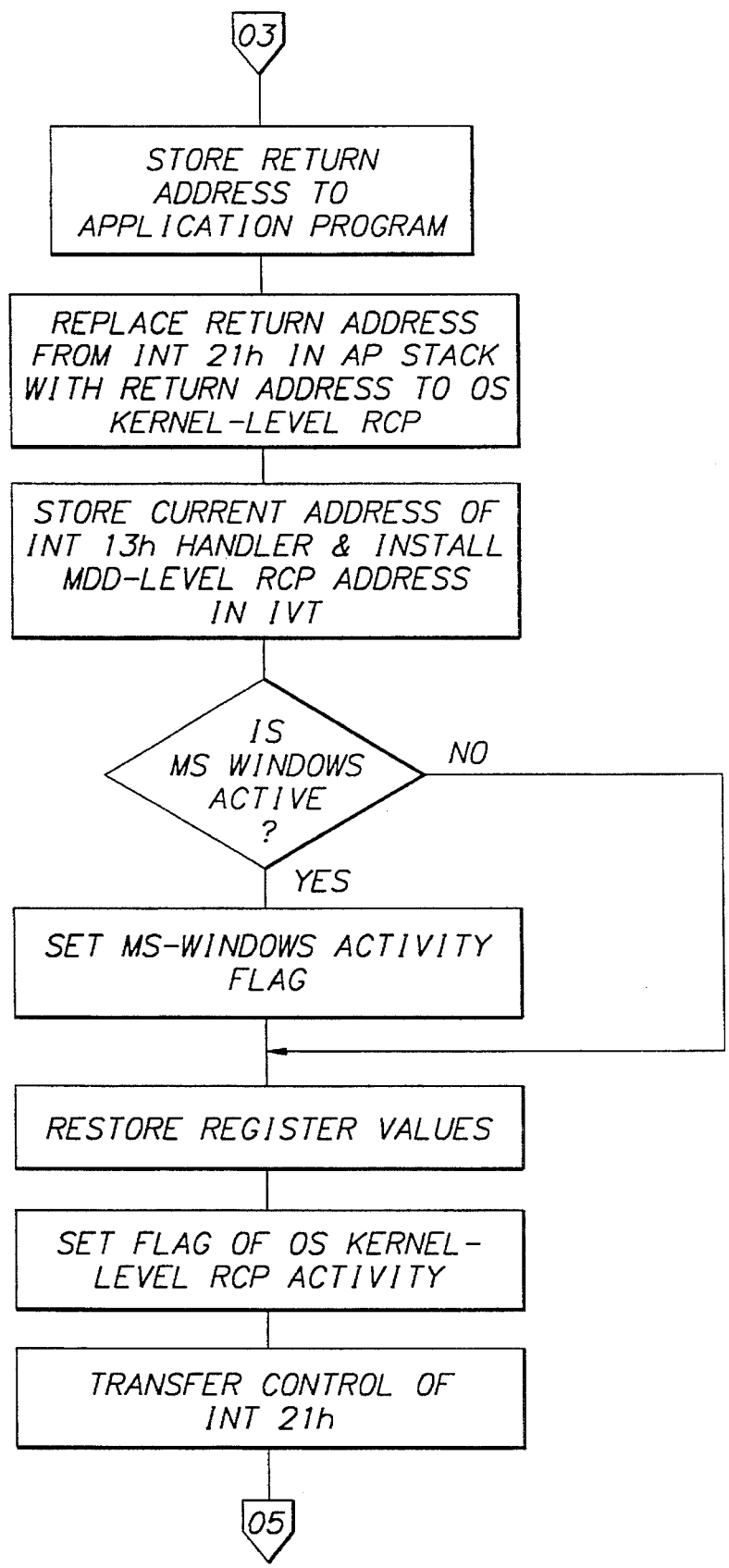
Figure 7E:
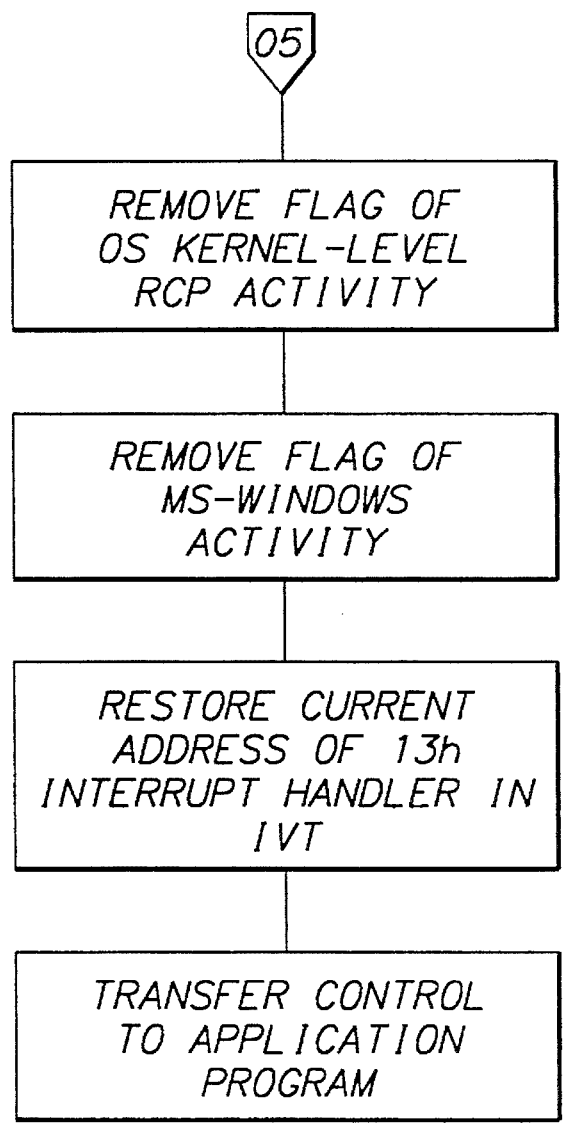
Figure 7F:
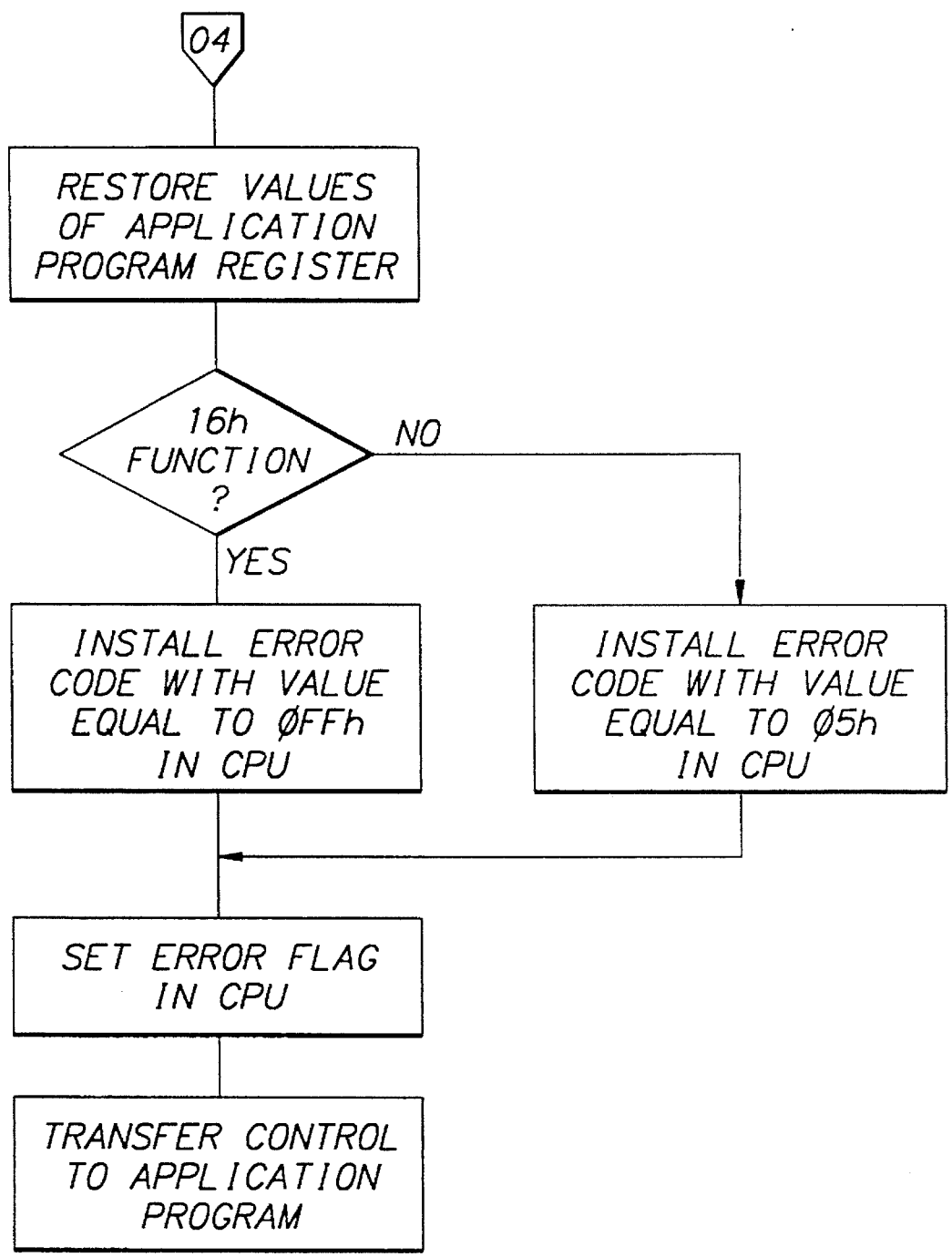

The OS kernel-level request check program 62 checks for a match between the current request and the set of dangerous requests at the OS 24 kernel level and prevents the servicing of dangerous requests by returning control to the application program and by setting an error flag in the CPU 56 (FIG. 7F). An example of setting an error flag is by setting the carry bit in the flags register of the CPU 56. The dangerous requests include requests to change file attributes in the absence of a protection control program activity flag and requests to write a track on a logic device. All other requests are interpreted as safe. If the request is a safe request, then the OS kernel-level request check program 62 does not prevent servicing of the request; in the event of requests to create files with the extensions .EXE, CON, .SYS, .OVL, .LIB, .DLL, or .BIN, the OS kernel-level request check program 62 ascribes the attribute "read only" (FIGS. 7B and 7C).

Figures 6, 6A, 6B:
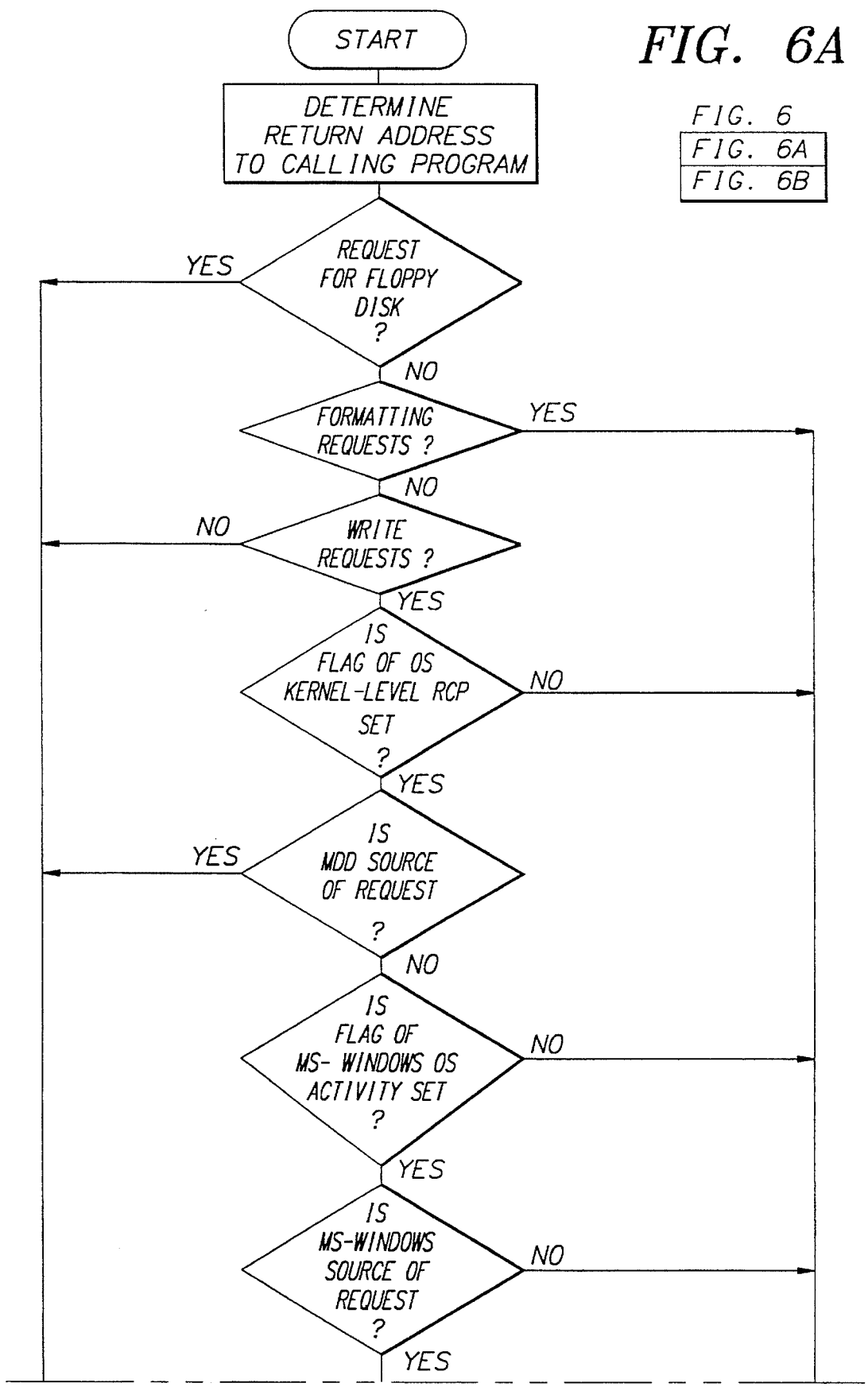
FIG. 6A–6B is a flow chart of the modular device driver-level request check program.
Figure 6B:
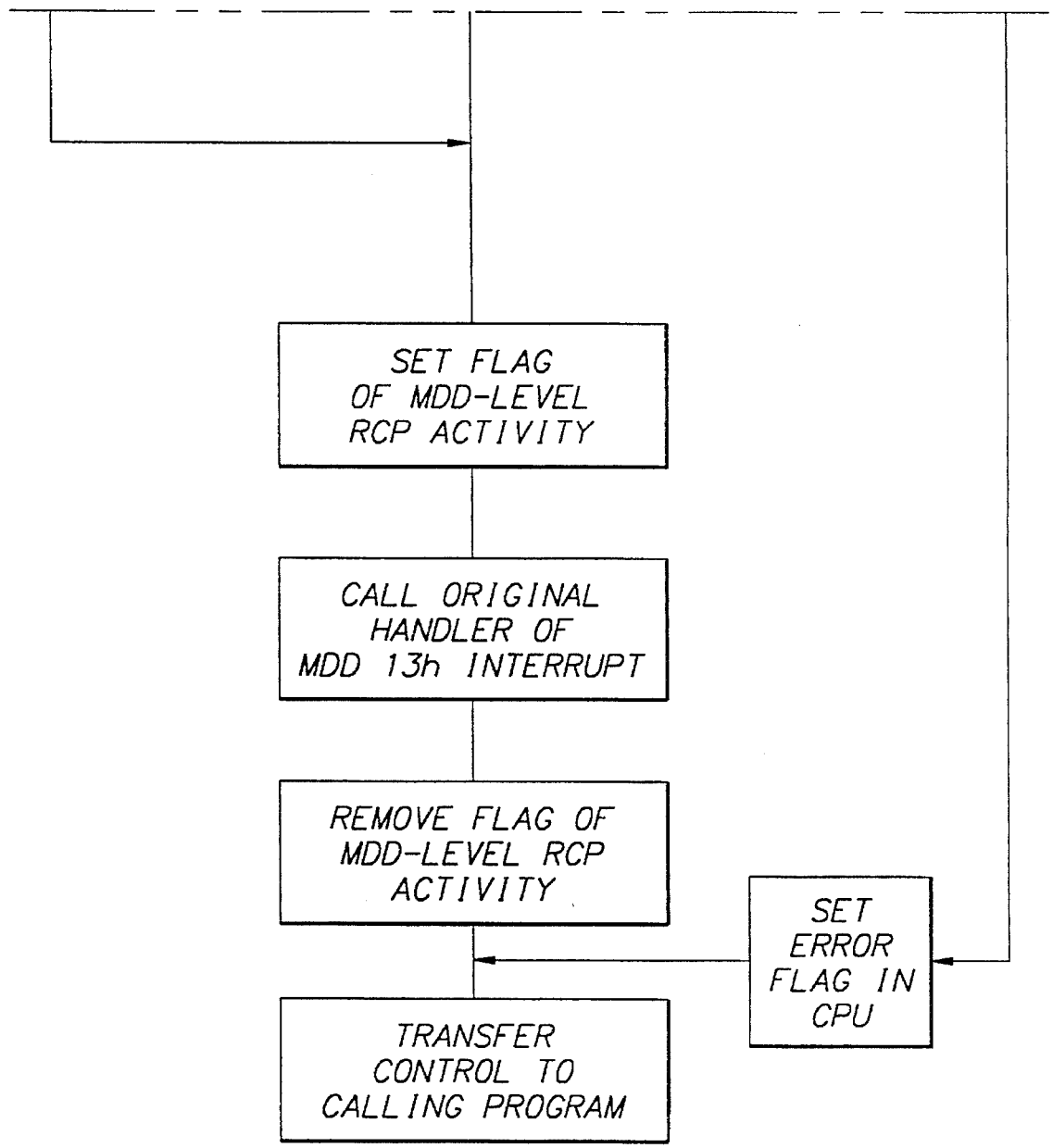

The modular device driver-level request check program 60 checks for a match between the current request and the set of dangerous requests at the modular device driver 26 level. Among the dangerous requests are hard disk 32 formatting requests. Other dangerous requests are write requests which are not preceded by use of the OS 24, and write requests from sources other than the modular device driver 26. All others requests are interpreted as safe. If the request is one of the dangerous requests, the MDD-level request check program 60 prevents servicing of the request by returning control to the calling program and by setting an error flag in the CPU 56 (FIG. 6B). Otherwise, the MDD-level request check program 60 does not prevent servicing of the request and calls the original handler of the 13h modular device driver interrupt (FIG. 6B).

Figure 5B:
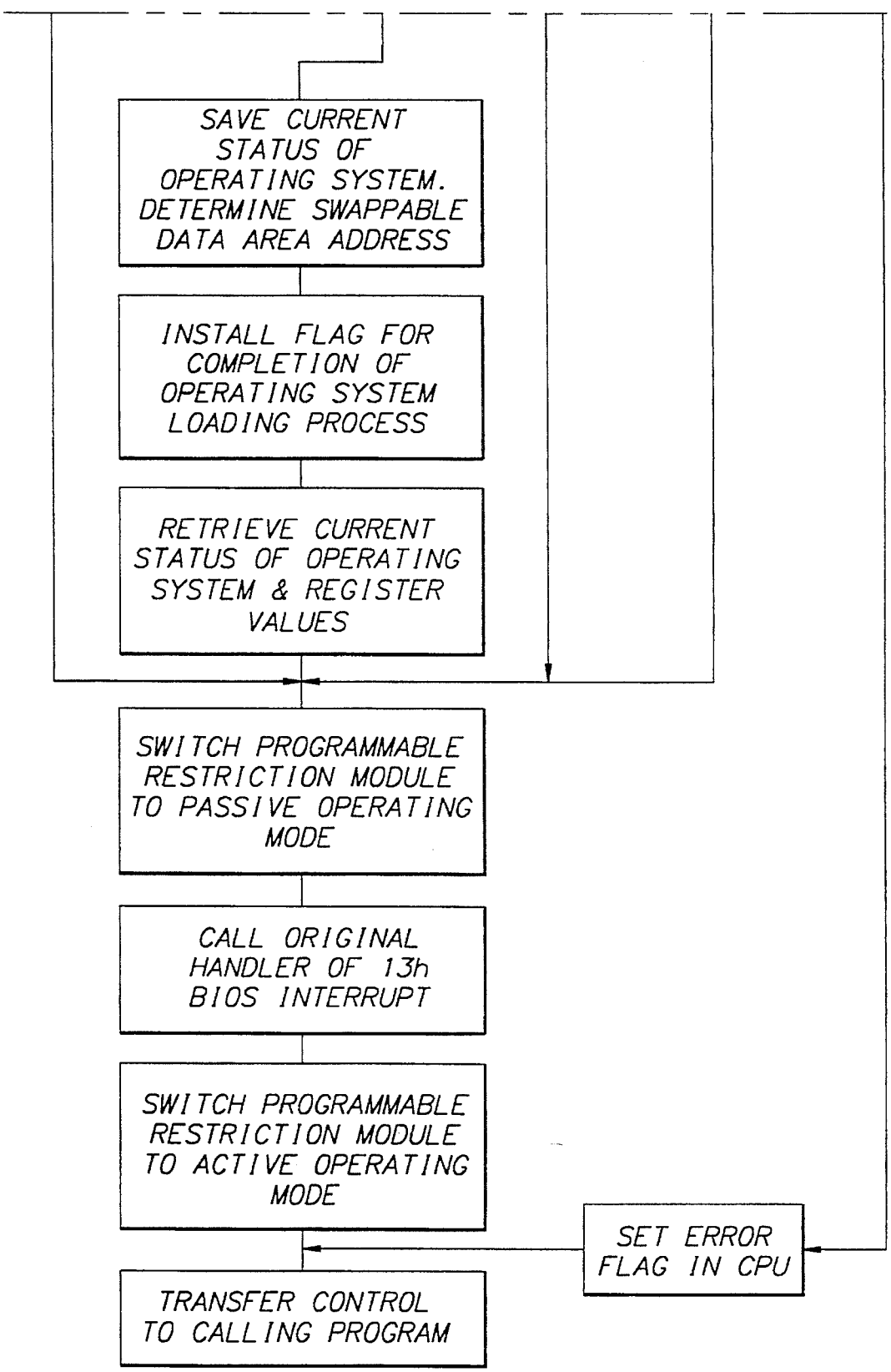

The BIOS-level request check program 58 checks for a match between the current request and the set of dangerous requests at the BIOS 28 level. The dangerous requests include hard disk 32 formatting requests, write requests not preceded by use of the modular device driver 26, and write requests from sources other than the modular device driver 26. The BIOS-level request check program 58 prevents the servicing of dangerous requests by returning control to the calling program and by setting an error flag in the CPU 56 (FIG. 5B). If the request is safe, the BIOS-level request check program 54 switches the PRM 20B to the passive operating mode and transfers control to the original handler of the 13h BIOS interrupt; after this handler services the request, the BIOS-level request check program 54 switches the PRM 20B into the active operating mode. An attempt to use the hard disk controller 30 when the PRM 20B is in the active mode will result in the removal of CPU 56 availability. In that event, the personal computer will have to be reset before further use. As a result, the only permitted access path to the hard disk controller 30 is an access path 46D using the BIOS 28.

A detailed description of the configuration and functional organization of the file-protection subsystem is given below.

Figure 3:
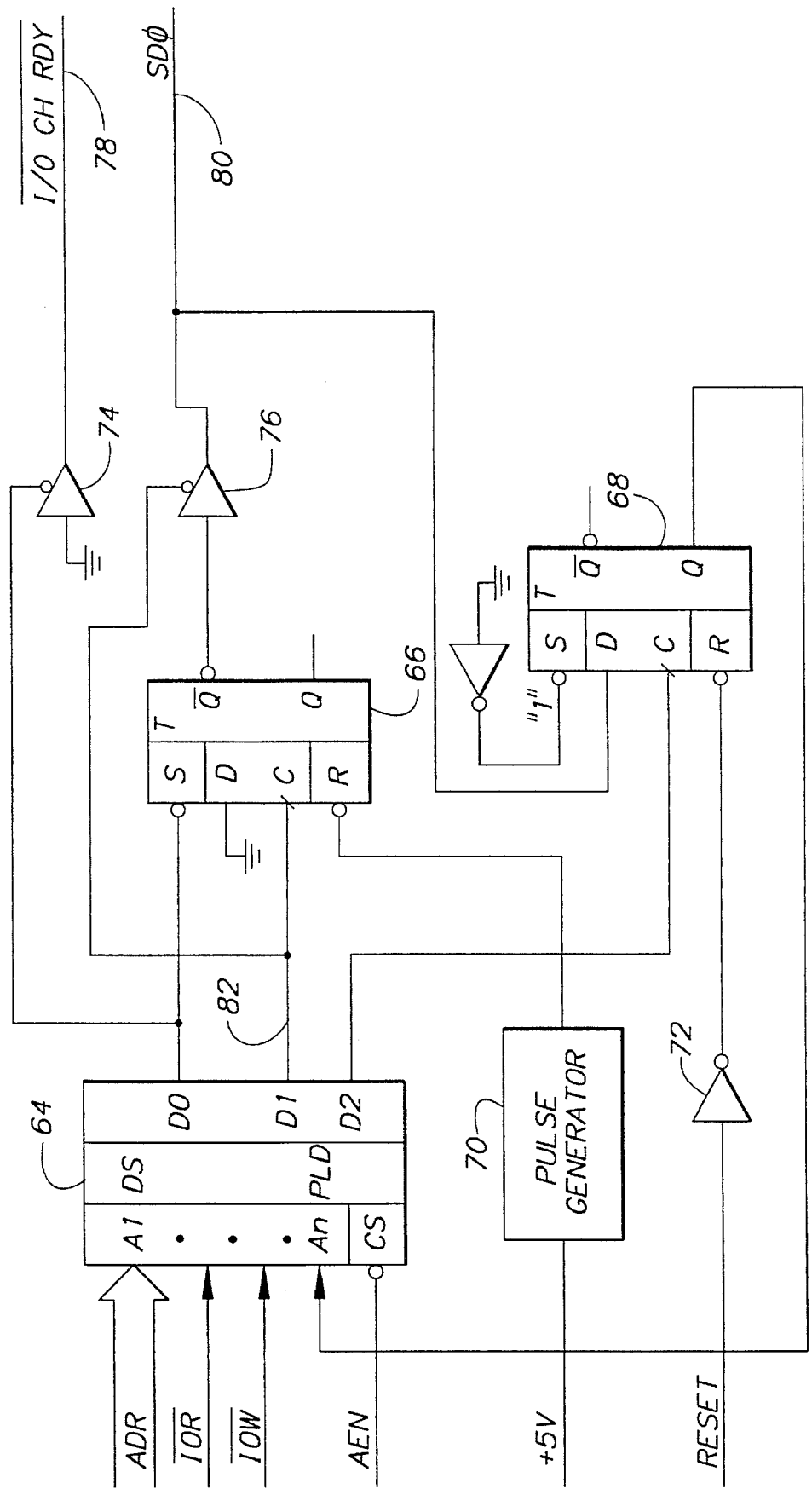
FIG. 3 is a functional diagram of the programmable restriction module.
Figure 4:
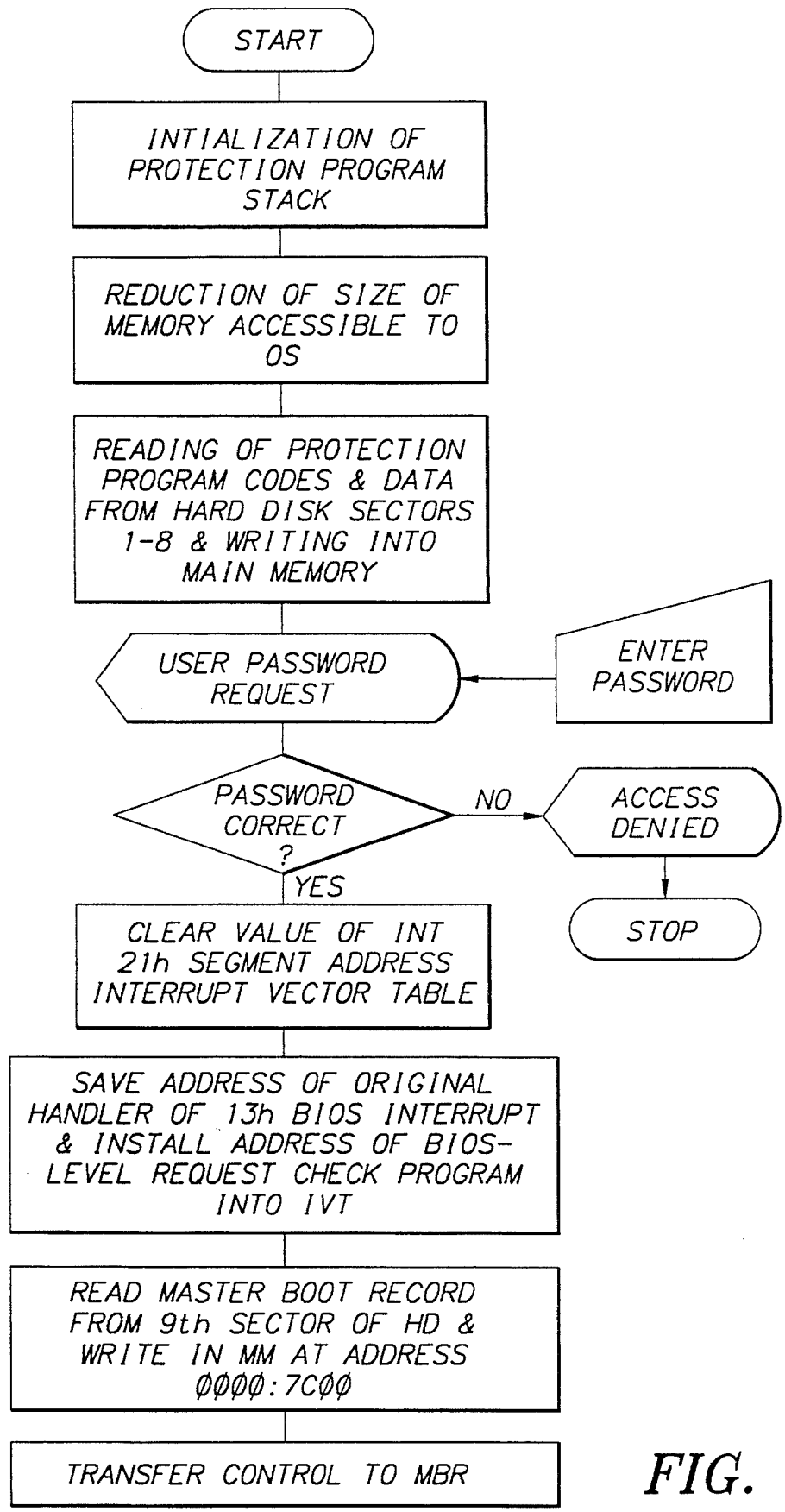
FIG. 4 is a flow chart of the protection initialization program.

As shown in FIG. 3, the PRM 20B contains a peripheral device port decoder 64, two D-type flip-flops 66 and 68, a pulse generator 70, an inverter 72, and two buffers 74 and 76.

The peripheral device port decoder 64 monitors the bus cycles involving CPU 56 access to the peripheral devices and produces a system-bus blocking signal $\overline{\text{I/O CH RDY}}$ on the system bus availability line 78 in the event of access to the hard-disk controller 32 registers. In addition, the peripheral device port decoder 64 produces signals that permit the reading of information from the first flip-flop 66 or the writing of information into the second D-type flip-flop 68. The peripheral device port decoder 64 is a programmable logic device with three outputs (D0, D1 and D2). The first output D0 of the peripheral device port decoder 64 is connected to the control input of the first buffer 74 and to the SET-input (S) of the first flip-flop 66; the second output D1 of the peripheral device port decoder 64 is connected to the control input of the second buffer 76 and the C-input of the first D-type flip-flop 66; and the third output D2 of the peripheral device port decoder 64 is connected to the C-input of the second D-type flip-flop 68.

The first D-type flip-flop. 66 records instances when the PRM 20B prevents an attempt to access the hard disk controller 30 registers.

The second D-type flip-flop 68 sets the operating mode of the PRM 20B.

The pulse generator 70 produces a reset signal (a low level logic pulse) for the first D-type flip-flop 66 when the supply voltage is initially received. This signal is a short negative pulse transmitted to the R-input of the first D-type flip-flop 66.

The inverter 72 changes the polarity of the RESET signal transmitted from the system bus to the R-input of the second D-type flip-flop 68.

The first buffer 74 is connected to the system-bus availability line 70 and removes availability from the personal computer system bus when a blocking signal $\overline{\text{I/O CH RDY}}$ is received from the first output D0 of the peripheral device port decoder 64.

The second buffer 76 is connected to the system data bus 52 via line 80 and is used to permit the reading of the state of the first D-type flip-flop 66.

The PRM 20B begins to operate after the personal computer is started. Upon startup, the output of the pulse generator 70 produces a signal to reset the first D-type flip-flop 66. At the same time, a system RESET signal is received by the inverter 72 which generates a reset signal to the R-input of the second D-type flip-flop 68 in order to reset the flip-flop. When these signals are present, a high-level logic signal is produced at the inverted output $\overline{Q}$ of the first D-type flip-flop 66, indicating the absence of thwarted attempts to access the hard disk 32, and a low-level logic signal is produced at the direct output Q of the second D-type flip-flop 68. The low-level logic signal from the direct output Q of the second D-type flip-flop 68 is transmitted to the first input (An) of the peripheral device port decoder 64 and sets the PRM 20B in the passive operating mode.

In order to switch the operating mode of the PRM 20B, the CPU 56 produces signals (a "1" or a "0") on the data bus 52, along with signals on the control 54 and address 50 busses (based on the input from the BIOS-level request check program, FIG. 5B, to be discussed later) that is latched into the second D-type flip-flop 68 which specifies the required operating mode. In particular, a one ("1") value for this bit specifies the active operating mode and a zero ("0") value specifies the passive operating mode. When present, the rising edge of the signal from the D2 output of the peripheral device port decoder 64 latches the "1" or "0" that is present on line 80, into the D input of the second D-type flip-flop 68.

Once in the active operating mode, the peripheral device port decoder 64 checks the bus cycles involving CPU 56 access to the peripheral devices. If the system output line sends an active signal, $\overline{IOW}$ (input/output write), to the input of the peripheral device port decoder 64 and if the address of the hard-disk controller 30 command register is on the address lines of the system unibus, then a low-level logic signal is produced at the first output D0 of the peripheral device port decoder 64 and is transmitted to the control input of the first buffer 74 and to the S-input of the first D-type flip-flop 66. As a result, the inverted output $\overline{Q}$ of the first D-type flip-flop 66 will have a low logic level. A low-level logic signal is produced at the output of the first buffer 74 and is transmitted to the personal computer system unibus availability line 78. This signal prevents the completion of the current bus cycle and any further use of the personal computer.

The personal computer must be reset before further use is possible. In the event of a system RESET signal, the PRM 20B switches to the passive operating mode, and the inverted output $\overline{Q}$ of the first D-type flip-flop 66 produces a low-level logic signal, which indicates that an attempt to access the hard disk has been denied. The CPU 56 checks the current state of the first D-type flip-flop 66 by reading the state of the SD0 signal generated by the first D-type flip-flop 66. The rising edge of the read signal on the line 82 from D1 writes into the first D-type flip-flop 66 the logic zero set at the D-input of the flip-flop 66. The first D-type flip-flop 66 then switches to the initial state.

The protection initialization program identifies the personal computer user, loads the OS 24 kernel into the main memory, and establishes a link between the BIOS-level request check program 58 and the original handler of the 13h BIOS program interrupt.

The protection initialization program resides in the first sector of the hard disk 32 and is loaded into the personal computer main memory before the master boot record (MBR) is loaded. The initialization-program stack is placed in the conventional memory. After the stack is installed, the initialization program decreases the amount of memory available to the OS 24 by the amount of memory occupied by the protection software 20A (FIG. 3). The initialization program decreases the amount of memory available to the OS 24 by correcting the two-byte value of the memory size, which is stored in the address 0040:0013h. After the amount of memory available to the OS 24 has been changed, the initialization program clears the last four Kbytes of the conventional memory.

After the memory area needed for the protection kernel is cleared, the protection initialization program uses the 02h function (Read Disk Sectors) of the 13h BIOS program interrupt to load the protection kernel into the main memory. After the protection kernel is loaded, the protection initialization program requests the personal computer user password. After the password is entered, the initialization program compares the signature of the password entered by the user with the password signature in the protection kernel. If the two signatures do not match, the protection initialization program outputs a message that use of the personal computer is prohibited and stops the CPU 56. If the signatures match, the protection initialization program undertakes to establish a link between the BIOS-level request check program 58 and the original handler of the 13h BIOS program interrupt.

The protection initialization program establishes a link between the BIOS-level request check program 58 and the original handler of the 13h BIOS program interrupt. To do this, the protection initialization program extracts from the interrupt vector table the address of the original handler of the 13h BIOS interrupt and places in the interrupt vector table the address of the BIOS-level request check program 58. The protection initialization program saves the address of the original handler of the 13h BIOS program interrupt, and the BIOS-level request check program 58 uses that address to transfer control to the original handler of the 13h BIOS program interrupt. After that link is established, the initialization program reads the MBR from the ninth sector of the hard disk 32, loads the MBR into the main memory, and transfers control to the MBR.

The BIOS-level request check program 58 uses the PRM 20B to limit the possible access paths to the hard-disk controller 30 and performs the following functions (FIGS. 5A–5B):

when the hard-disk partition table is read, the BIOS-level request check program 58 places in the sector number register the number of the ninth sector used to store the original hard-disk partition table;

when the OS 24 is being loaded, the BIOS-level request check program 58 monitors the OS 24 loading process, and after this process is completed, establishes a link between the MDD-level request check program 60 and the original handler of the 13h modular device driver interrupt;

when the personal computer is being used, the BIOS-level request check program 58 establishes a link with the modular device driver 26 and prevents the servicing of dangerous requests.

when the OS 24 is being loaded, the BIOS-level request check program 58 identifies read requests using the 02h (Read Disk Sectors), 0Ah (Read Long Sectors), or 0Eh (Read Sector Buffer) functions (i.e., the standard input/output function of BIOS) of the 13h BIOS interrupt. The BIOS-level request check program 58 checks for the presence of two OS loading completed flags. The first OS loading completed flag is the placement of the address of the original handler of the 21h interrupt in the interrupt vector table. The second OS loading completed flag is the OS initialization completed flag, which is returned by the 1200h function (Get DOS Installation Status) of the 2Fh OS program interrupt (Multiplex Service). In the absence of these OS loading completed flags, the BIOS-level request check program 58 switches the PRM 20B into the passive operating mode and calls the original handler of the 13h BIOS interrupt. The BIOS-level request check program 58 then switches the PRM 20B back into the active operating mode.

If the OS loading completed flags are present, the BIOS-level request check program 58 places in the interrupt vector table the address of the MDD-level request check program 60 and stores the address of the original handler of the 13h modular device driver interrupt in the MDD-level request check program 60. Then the BIOS-level request check program 58 copies the data determining the current state of the OS 24 into the conventional memory, and, using the 5D06h function (Get Critical-Error Flag Address) of the 21h OS interrupt, determines the address of the swappable data area (SDA). After the address of that area is determined, the BIOS-level request check program 58 sets an OS loading completed flag and restores the current OS state using the copy of the data determining the current OS state.

While the personal computer is in use, the BIOS-level request check program 58 establishes a link with the modular device driver 26 and prevents the servicing of dangerous requests. When a formatting request is identified, the check program prevents the servicing of the request by returning control to the calling program and by setting an error flag in the CPU 56. When a write request is identified, the check program 58 checks the path used to access the hard-disk controller 30. If the flag of the MDD-level request check program 60 activity is not set or if the request source is not the modular device driver 26, the check program 58 prevents the servicing of the request and returns control to the calling program and by setting an error flag in the CPU 56.

For the servicing of requests, the BIOS-level request check program 58 switches the PRM 20B into the passive operating mode and calls the original handler of the 13h BIOS program interrupt (FIG. 5B). After the request is serviced and control is returned to the BIOS-level request check program 58, the program switches the PRM 20B to the active operating mode.

The MDD-level request check program 60 (FIGS. 6A–6B) identifies hard disk formatting requests and prevents servicing of the request by returning control to the calling program and by setting an error flag in the CPU 56. When a write request is identified, the check program 60 checks the path used to access the hard-disk controller 32. If the flag of OS kernel-level request check program 62 activity is not present, the check program 60 prevents the servicing of the request and returns control to the calling program and by setting an error flag in the CPU 56. In addition, the MDD-level request check program 60 prevents the servicing of requests from sources other than the modular device driver 26 or the MS-WINDOWS operating environment.

For the servicing of requests, the MDD-level request check program 60 sets a flag of its own activity and calls the original handler of the 13h modular device driver program interrupt. After the request is serviced and control is returned to the MDD-level request check program 60, the program 60 removes the flag of its own activity.

The OS kernel-level request check program 62 checks the number of the requested function of the 21h OS interrupt and, if the 0Ch (Clear Buffer and Input), 31h (Terminate and Stay Resident), 48h (Allocate Memory), 49h (Release Memory), 4Ah (Modify Memory Allocation), 4Bh (Execute Program), or 4Ch (Terminate with Return Code) function is identified, returns control to the original handler of the 21h OS program interrupt. In the event of other requests, the OS kernel-level request check program 62 copies the values of the registers used by the original handler of the 21h OS interrupt into the memory area used by the protection software 20A. Then the request check program 62 extracts from the swappable data area (SDA) the value of the application program stack indicator and copies the application program stack to the memory area used by the protection software 20A. After the stack copy is made, the OS kernel-level request check program 62 checks the number of the requested function and identifies the 16h (Create File with File Control Block), 3Ch (Create File with Handle), 6Ch (Extended Open/Create), 4301h (Set File Attributes), or 440Dh (Write Track on Logical Drive) function of the 21h OS interrupt, each of these functions involving a separate protection procedure.

For the 16h function (Create File with File Control Block) of the 21h OS interrupt, the OS kernel-level request check program 62 determines the format of the file control block (FCB, FIG. 7B). If the FCB has an extended format, the check program determines the extension of the file being created. For files with extensions of .EXE, .COM, .SYS, .OVL, .LIB, .DLL, or .BIN, the OS kernel-level request check program 62 ascribes the attribute "Read Only" by modifying the file attribute field in the FCB.

For the 3Ch (Create File with Handle) and 6C00h (Extended Open/Create) functions (FIG. 7C), the OS kernel-level request check program 62 checks the format of the ASCIIZ line (characters being represented in ASCII format and where the final character in the string is ASCII character "0") indicated in the call of said functions. If the ASCIIZ line format is not correct, i.e., the ASCIIZ line does not contain a final zero, then the OS kernel-level request check program 62 returns control to the program creating the file (FIG. 7F). The OS kernel-level request check program 62 also sets an error flag in the CPU 56 and installs the error code "Access Denied" (FIG. 7F). If the ASCIIZ line format is correct, the program 62 determines the extension of the file being created. For files with extensions of .EXE, COM, .SYS, .OVL, .LIB, .DLL, or .BIN, the OS kernel-level request check program 62 (FIG. 7C) places the attribute "Read Only" in the application program stack storing the value of the CX register (the Count register of the CPU 56). In addition, the OS kernel-level request check program 62 places the attribute in the copy of the value of the CX register used by the original handler of the 21h OS interrupt.

For the 4301h (Set File Attributes, which permits a program to change a file's attributes) function (FIG. 7A), the OS kernel-level request check program 62 checks for the activity flag of the protection control program having the privilege of changing file attributes. If the activity flag of the protection control program is absent, the OS kernel-level request check program 62 prevents the servicing of the request by transferring control to the program requesting the change in file attributes and by setting an error flag in the CPU 56 and installing the error code "Access Denied" (FIG. 7F).

For the 440Dh (which includes Minor Code 41h: Write Track on Logical Drive) function (FIG. 7A), the OS-kernel-level request check program 62 identifies a request to write a track on a logic device that is a prototype of the hard disk 32, and prevents servicing of the request by transferring control to the program requesting to write a track and by setting an error flag in the CPU 56 and installing the error code "Access Denied" (FIG. 7F).

After a protection procedure involving one of the above-mentioned functions is performed, the OS kernel-level request check program 62 changes the return address from the original handler of the 21h interrupt in the application program stack. The OS kernel-level request check program 62 saves the return address from the original handler to the application program and places the return address to the OS kernel-level request check program 62 in the application program stack. Then the OS kernel-level request check program 62 places the address of the MDD-level request check program 60 in the interrupt vector table and stores the current address of the handler of the 13h modular device driver interrupt in the memory area used by the protection software 20A. After the current address of the 13h interrupt handler is changed in the interrupt vector table, the OS kernel-level request check program 62 uses the 1600h function of the 2Fh program interrupt (Multiplex Interrupt) to check for activity of the MS-Windows operating environment. If the value returned to the AX register (the Accumulator register of the CPU 56) is not 1600h, the check program 62 sets the MS-Windows activity flag. Then the OS kernel-level request check program 62 restores the register values based on the copy of the register values used by the original handler of the 21h OS interrupt, sets its own activity flag, and returns control to the original handler of the 21h program interrupt. After the request is serviced and control is returned to the OS kernel-level request check program 62, the request check program 62 removes its own activity flag and the activity flag of the Windows operating environment. Then the OS kernel-level request check program 62 restores the current address of the 13h modular device driver interrupt handler and transfers control to the application program 22.

As stated earlier, the purpose of the protection control program is to change file attributes. It is the only application program 22 which has the privilege of changing the status of files. In order to use this privilege, the protection control program sets its own activity flag before calling the 4301h function of the 21h OS interrupt and removes that flag after the request is serviced. The activity flag for the protection control program is set using the data byte declared in the OS kernel-level request check program 62. The protection control program determines the memory address for the activity flag with the aid of the 1111h function (Search for First Entry (FCB)) of the 21h OS program interrupt; the OS kernel-level request check program 62 processes the above-mentioned function and returns the value memory address for the activity flag to the protection control program.

Another embodiment of this invention accomplishes the same type of access restriction accompanied with secure monitoring of the permitted path.

Figure 8:
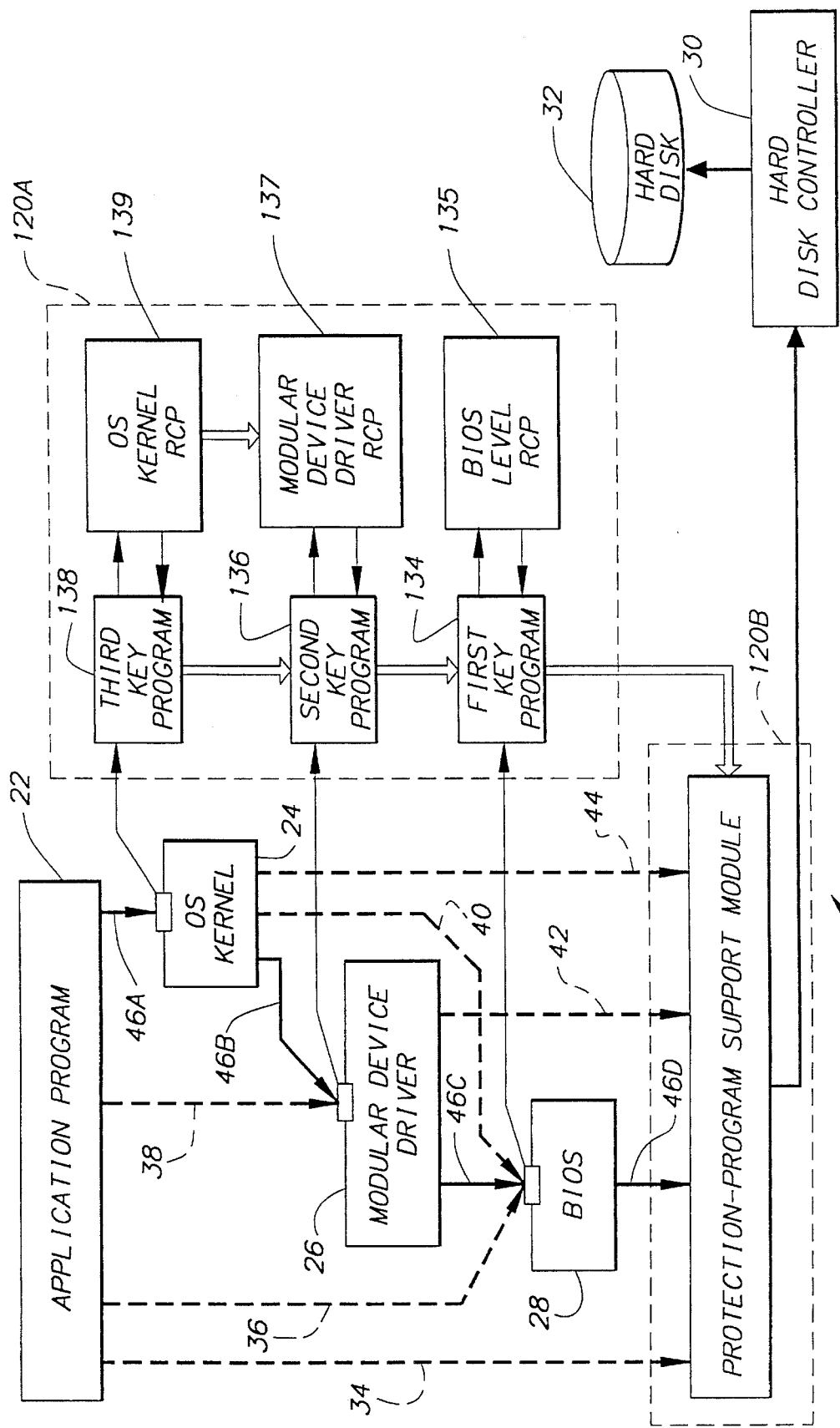
FIG. 8 is an interface diagram of another embodiment of this invention showing the configuration of its respective protection kernel.
Figure 9:
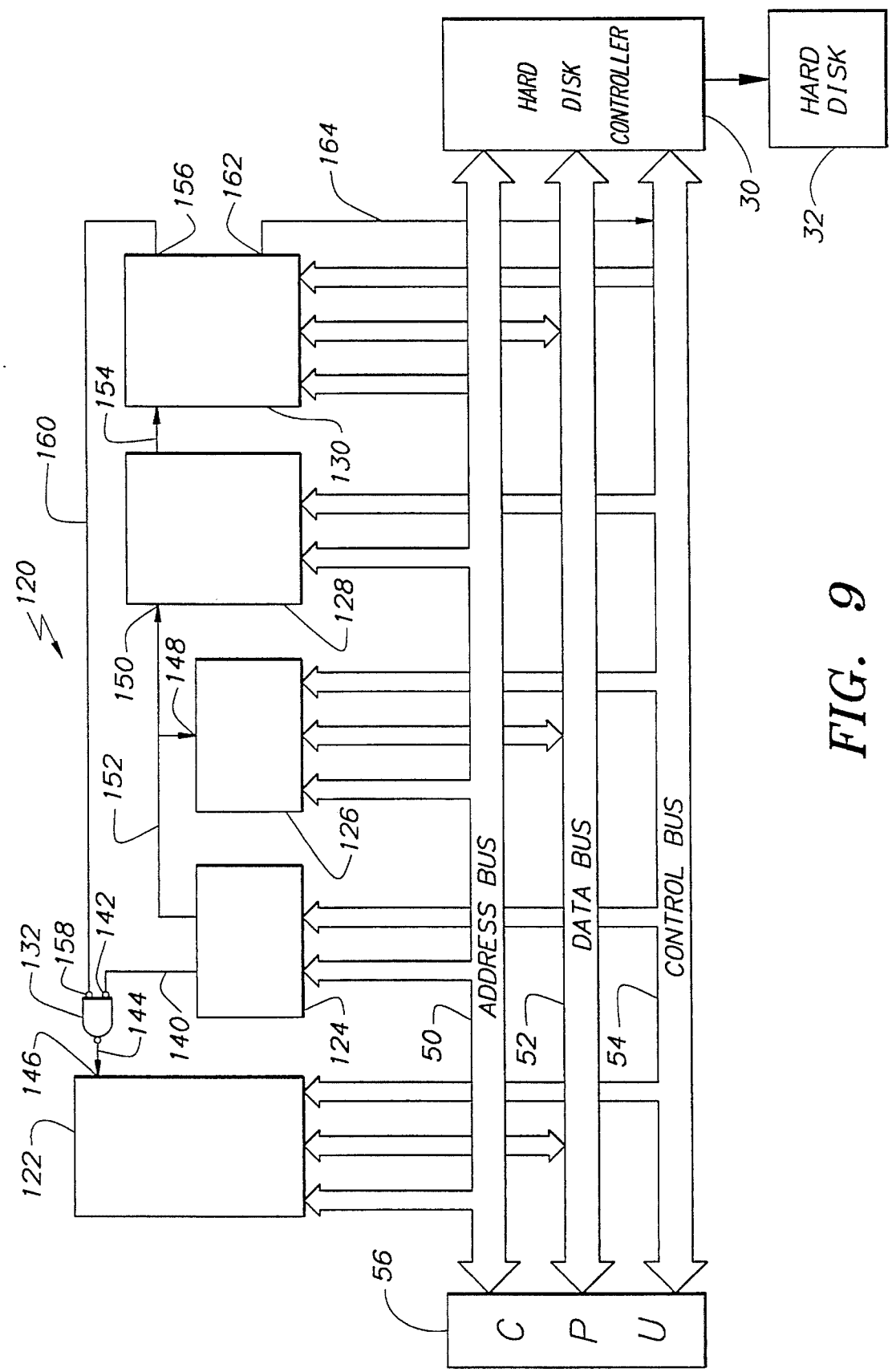
FIG. 9 is a structural diagram of the protection-program support module.

To that end, there is shown at 120 in FIG. 8 a protection-program subsystem that comprises hardware and protection programs 120A on a single computer board, known as the protection-program support module 120B (PPSM). As shown in FIG. 9, the protection programs 120A and the PPSM 120B restrict all paths 34–44 between the application software 22 and the hard drive controller 30 while monitoring the security of requests involving one access path 46A–46D and 48, as discussed earlier with respect to the file protection subsystem 20.

However, the interfaces between the PPSM 120B and the computer busses are different than the PRM 20B. In particular, as shown in FIG. 9, the PPSM 120B comprises a first memory 122, an address decoder 124, a second memory 126, a program discriminator 128, a programmable controller 130, and an AND gate 132. Each of these (except for the AND gate 132) is connected to the computer's address bus 50, data bus 52 and control bus 54, accordingly. The interaction of these components will be discussed later.

The PPSM 120B is an external board connected to the personal computer address bus 50, data bus 52 and control bus 54. The PPSM 120B provides hidden storage for the protection programs 120A and establishes a logical dependence between the execution phase of the protection programs 120A and the possibility of using the hard disk 32, as will be discussed in detail later.

The PPSM 120B has two operating modes. In the first (passive or neutral) operating mode, the PPSM 120B does not affect CPU 56 access to the peripheral devices. In the second (active or working) operating mode, the PPSM 120B monitors the bus cycles involving CPU 56 access to the peripheral devices and produces a blocking signal in the bus cycle of data output to the command register of the hard disk controller 30, thereby preventing the completion of the current bus cycle by removing availability from the CPU 56.

The first memory 122 stores the protection programs 120A, and this memory 122 can be inaccessible to the CPU 56. The second memory 126 is always accessible to the CPU 56 and is used to store the different versions (134, 136 and 138, FIG. 8) of the key program (FIG. 14), which is capable of changing the state of the PPSM 120B. As shown in FIG. 9, the address decoder 126 has two outputs and divides the address space occupied by the PPSM 120B memories between the first memory 122 and the second memory 126. The first output of the address decoder 126 is connected via line 140 to the first input 142 of the AND gate 132. The output 144 of AND gate 132 is connected to the select input 146 of the first memory 122. The second output of address decoder 124 is connected to the select input 148 of the second memory 126 and also to the control input 150 of the program discriminator 128 via line 152. The output of the program discriminator 128 is connected to the programmable controller 130 via line 154. The memory access control output 156 of the programmable controller 130 is connected to the second input 158 of the AND gate 132 via line 160. Finally, the blocking signal output 162 of the programmable controller 130 is connected to the computer control bus 54 via line 164.

The program discriminator 128 determines the type of program acting on the programmable controller 130 and establishes the logical relationship between the type of above-mentioned program and the possibility of switching the PPSM 120B. The program discriminator 128 determines the type of program acting on the programmable controller 130 by testing the correspondence between the content of the bus cycles for the extraction and execution of this program and the content of the bus cycles for the extraction and execution of the key program. The program-extraction cycles are the cycles for reading the codes of the key program from the second memory 126. The program-execution cycles are the cycles for outputting information to the programmable controller 130. If the cycle content corresponds to that of the key program, the program discriminator 128 generates a signal which confirms the activity of the key program. This signal is sent along line 154 to the programmable controller 130, and makes it possible to record information in the controller 130. If the cycle content does not correspond to the key program, the program discriminator 128 does not allow the entering of information into the programmable controller 130.

The programmable controller 130 blocks access to the hard-disk controller 30 and prevents access to the first memory 122. The CPU 56 can program the mode of the controller 130 only when the signal indicating the activity of the key program is present. The programmable controller 130 stores the given code and generates control signals corresponding to the given operating mode.

If the programmable controller 130 contains the code allowing access to the memory 122, the controller 130 generates a signal allowing access to the first memory 122. If the programmable controller 130 contains the code preventing access to the memory 122, the controller 130 generates a signal preventing access to the first memory 122, by blocking the AND gate 132. In particular, if a high level logic signal is present on line 160 the gate 132 does not permit the transmission of select signals for the first memory 122 as requested by address decoder 124 on line 140. If a high level logic signal is not present on line 160, the AND gate 132 does not prevent the transmission of select signals for the first memory 122 as requested by address decoder 124 on line 140.

If the neutral-state code is stored in the programmable controller 130, the latter does not affect access by the CPU 56 to the hard-disk controller 30. If the working-state code is stored in the programmable controller 130, the latter verifies the bus cycles for CPU 56 access to output devices. If a cycle for CPU 56 access to the hard-disk controller is found, the programmable controller 130 generates a signal which blocks access to the hard-disk controller 30. This signal is sent through line 164 to the system ready line and prevents the completion of the current bus cycle and any further use of the personal computer. The personal computer must be reset (and the PPSM 120B reset) before any further use is allowed.

The details of the hardware operation of the PPSM 120B will be discussed later following the discussion of the protection programs 120A.

The initial state of the PPSM 120B is the neutral state (the passive mode), and the first memory 122 is read-accessible. In this regard, it should be noted that the reset signal causes the CPU 56 to determine the personal-computer configuration and transfer control to programs resident in the external-device ROM. Since the first memory 122 of the PPSM 120B occupies the region of address space reserved for the external-device ROM, the protection programs 120A receive control before the OS 24 is loaded. As a result, the protection programs 120A, using versions (134, 136 and 138) of the key program (that correspond to a respective level request check program discussed below), can switch the PPSM 120B into the required state before the personal computer is in the ready state. In particular, the key program can switch the PPSM 120B into the working state (the active mode) after the OS 24 is loaded. In addition, the protection programs 120A can prevent access to the first memory 122 and can be hidden from the applications software 22 and the OS 24.

Figure 10:
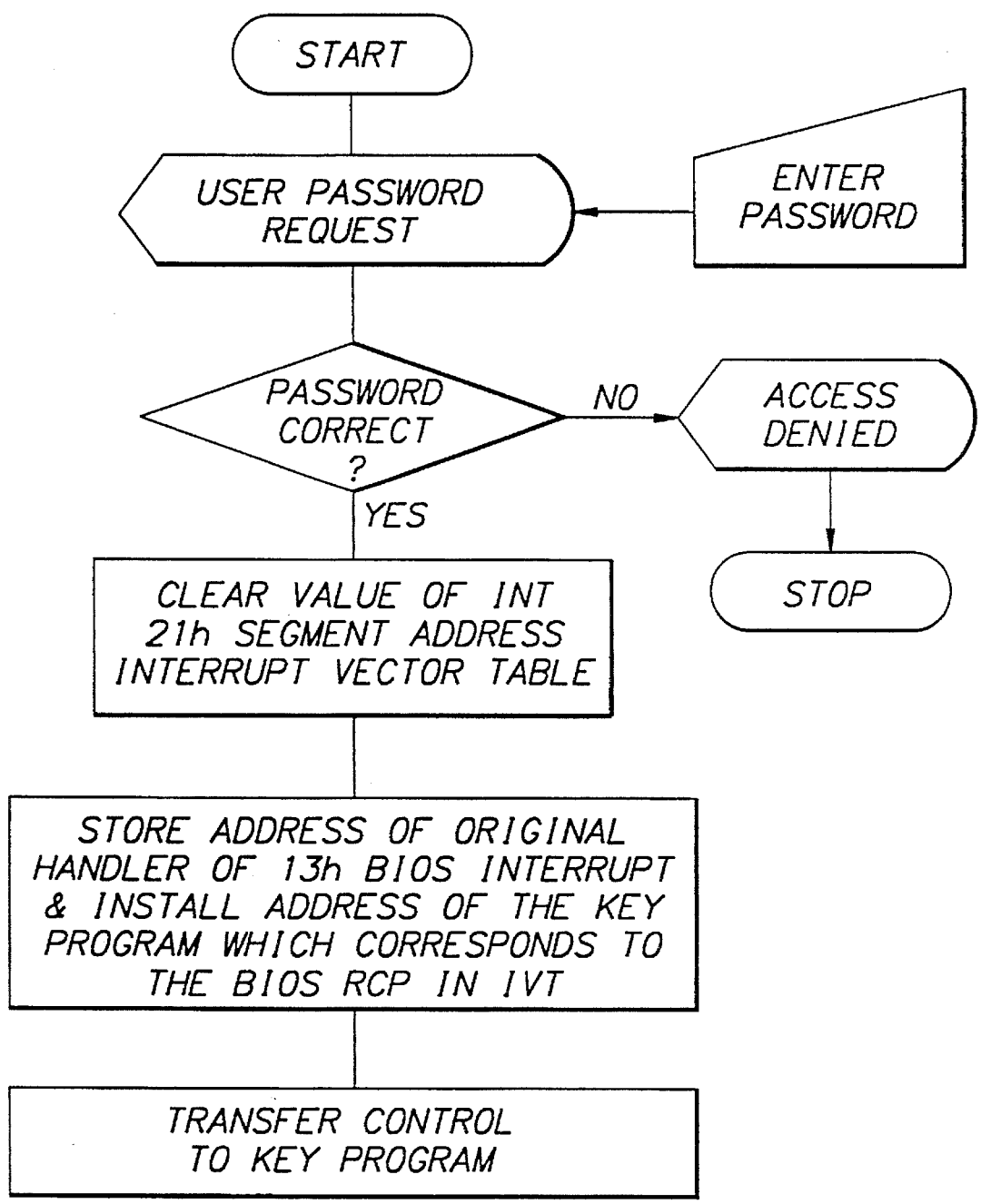
FIG. 10 is a flow chart of the protection initialization program.

The protection programs 120A include a protection initialization program (FIG. 10), a protection kernel, and a protection control program. The protection kernel has a three-level configuration and consists of three components: a program 135 which checks requests at the BIOS level (FIGS. 11A–11B), a program 137 which checks requests at the modular device driver level (FIGS. 12A–12B), and a program 139 which checks requests at the OS kernel level (FIGS. 13A–13F). Each component of the protection kernel uses a specific link with an individual component of the OS 24, modular device driver 26, or BIOS 28. The OS kernel-level request check program 139 is linked with the original handler of the 21h OS interrupt by removing from the OS kernel the call of the 82h function of the 2Ah OS program interrupt and inserting into the OS 24 kernel the call code for the key program 138 in the memory 126 which corresponds to the request check program 139 at the OS 24 level. The modular device driver-level request check program 137 uses a link established by replacing the address of the original handler of the 13h interrupt of the modular device driver 26 in the interrupt vector table with the call code for the key program 136 in the memory 126 which corresponds to the modular device driver-level request check program 137. The BIOS-level request check program 135 uses a link established by replacing the address of the original handler of the 13h BIOS interrupt used by the modular device driver 26 with the call code for the key program 138 in the memory 126 which corresponds to the BIOS-level request check program 135. In addition, the BIOS-level request check program 135 uses a link established by replacing the address of the original handler of the 13h BIOS program interrupt in the interrupt vector table with the address of the key program 134 corresponding to the BIOS-level request check program 135, thus providing an auxiliary link which is used during loading of the OS 24.

Figure 14:
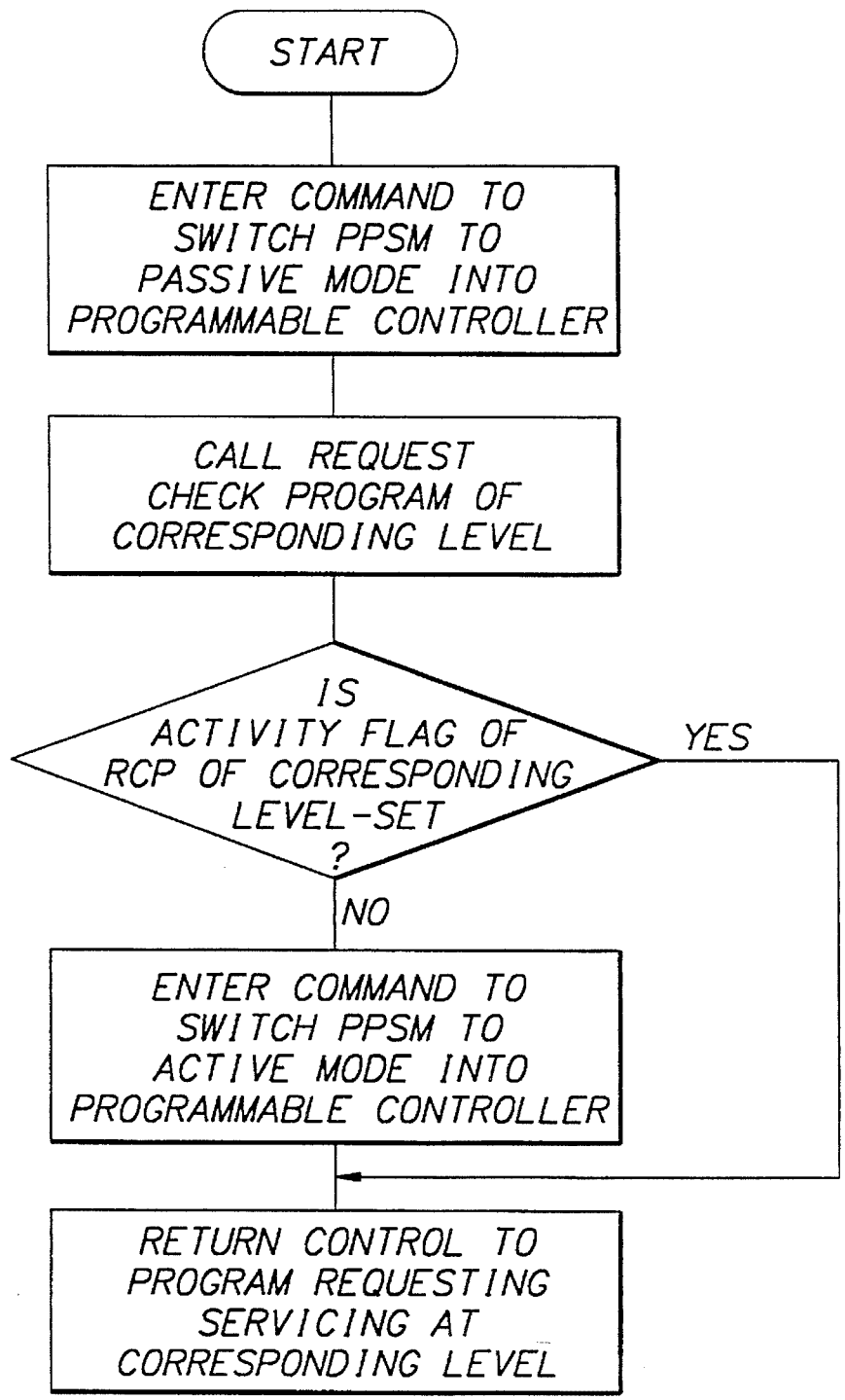
FIG. 14 is a flow chart for a key program.

Each component of the protection kernel uses its own version of the key program (FIG. 14). All the versions (134, 136 and 138) of the key program are stored in the second memory 126 of the PPSM 120B. Each version of the key program switches the PPSM 120B into the passive mode when control is transferred to the component of the protection kernel corresponding to the level of the request, and switches the PPSM 120B into the active mode when control is returned to the program which requested the service at the corresponding level. An attempt to use the hard-disk controller 30 when the PPSM 120B is in the active mode results in the removal of availability from the CPU 56, and the personal computer must be reset before further use is possible. As a result of this, the only permissible access path to the hard-disk controller 30 is the access path using components of the protection kernel.

The first memory 122 stores the protection initialization program and the protection kernel. The protection control program is stored on the hard disk 32 as an ordinary file.

The protection initialization program (FIG. 10) is stored in the ROM of the personal-computer peripheral devices, and obtains control at the stage when the BIOS ROM-Scan system procedure is performed. As a result, the protection initialization program receives control before the OS 24 is loaded. The protection initialization program identifies the user based on the entered password and establishes a link between the BIOS-level request check program 135 and the original handler of the 13h BIOS interrupt.

The BIOS-level request check program 135 monitors the process of loading the OS 24 kernel into the working memory of the personal computer, and establishes, after loading is completed, a link between the modular device driver-level request check program 137 and the original handler of the 13h modular device driver interrupt. Further functioning of the protection kernel is initiated by information requests from the application program 22, and depends on the type of request. The protection kernel supplements the file-protection measures performed by the OS 24 kernel, and grants the protection control program the privilege of changing the status of files.

The purpose of the protection control program is to change the user password and file attributes. It is the only application program that has the privilege of changing the status of files or the user password. To use these privileges, the protection control program sets its own activity flag when requesting a change of file attribute or user password. The activity flag of the privileged program is checked by the OS kernel-level request check program 139.

Figure 13A:
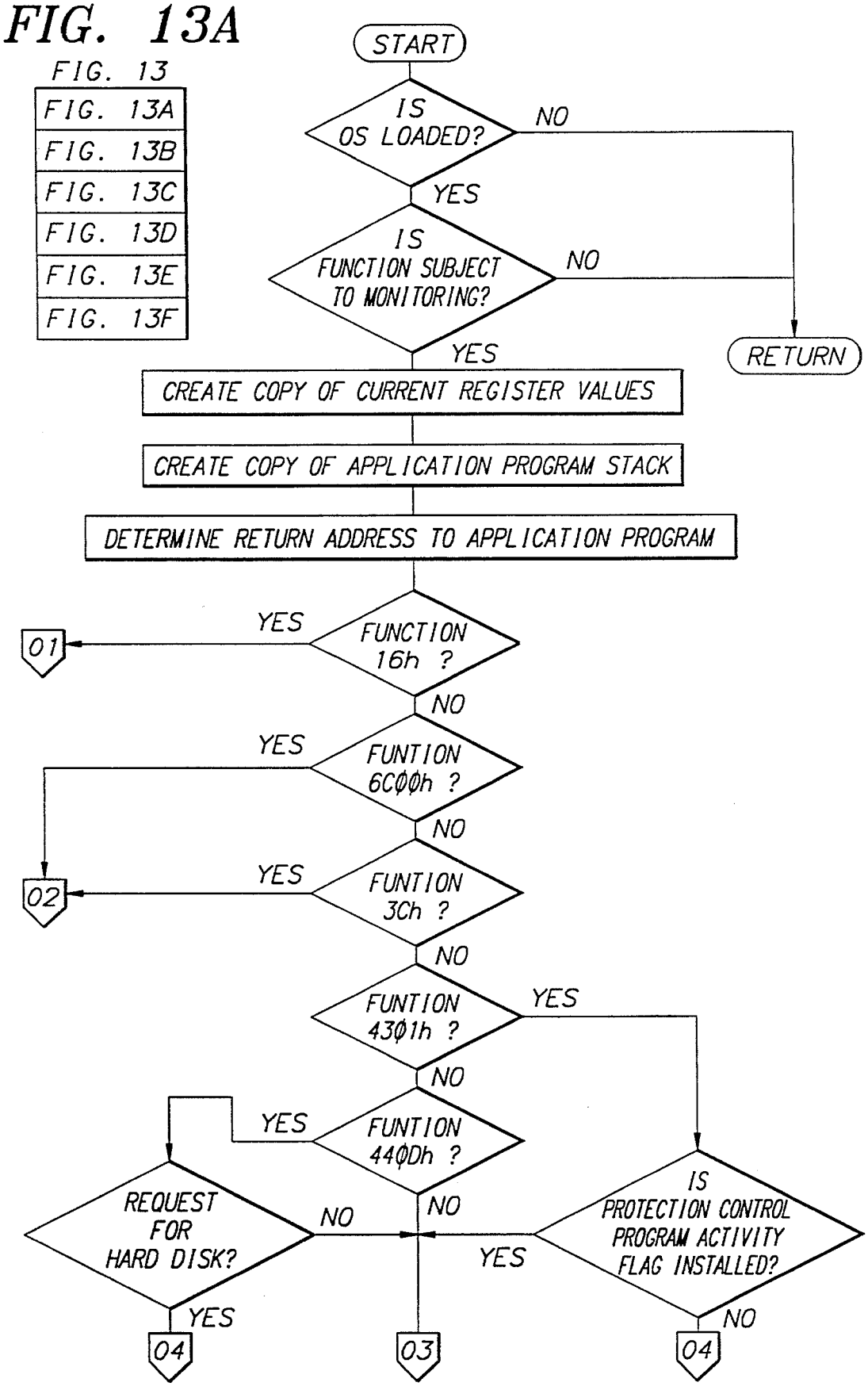
FIGS. 13A–13F is a flow chart of the OS kernel-level request check program.
Figure 13B:
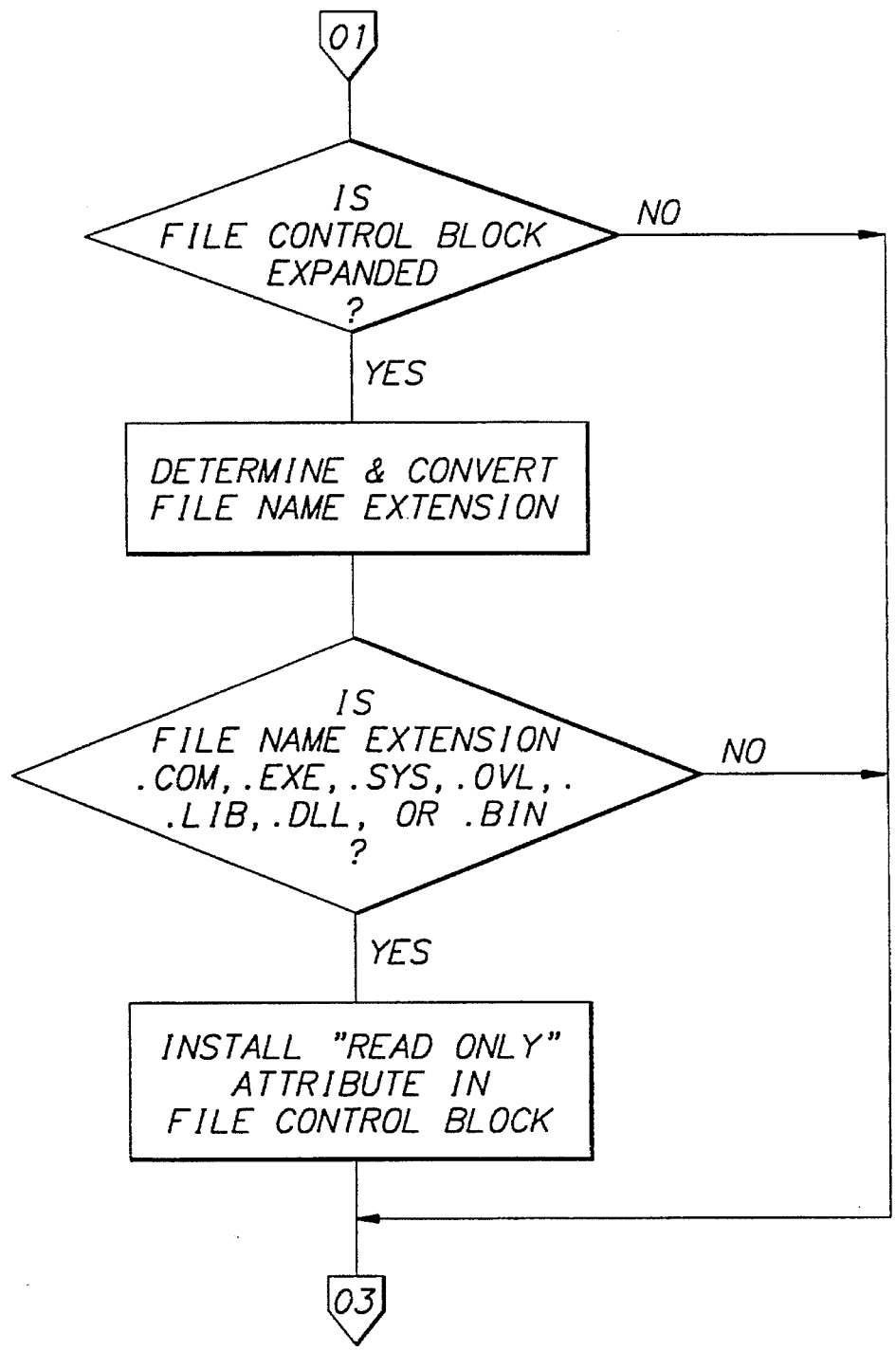
Figure 13C:
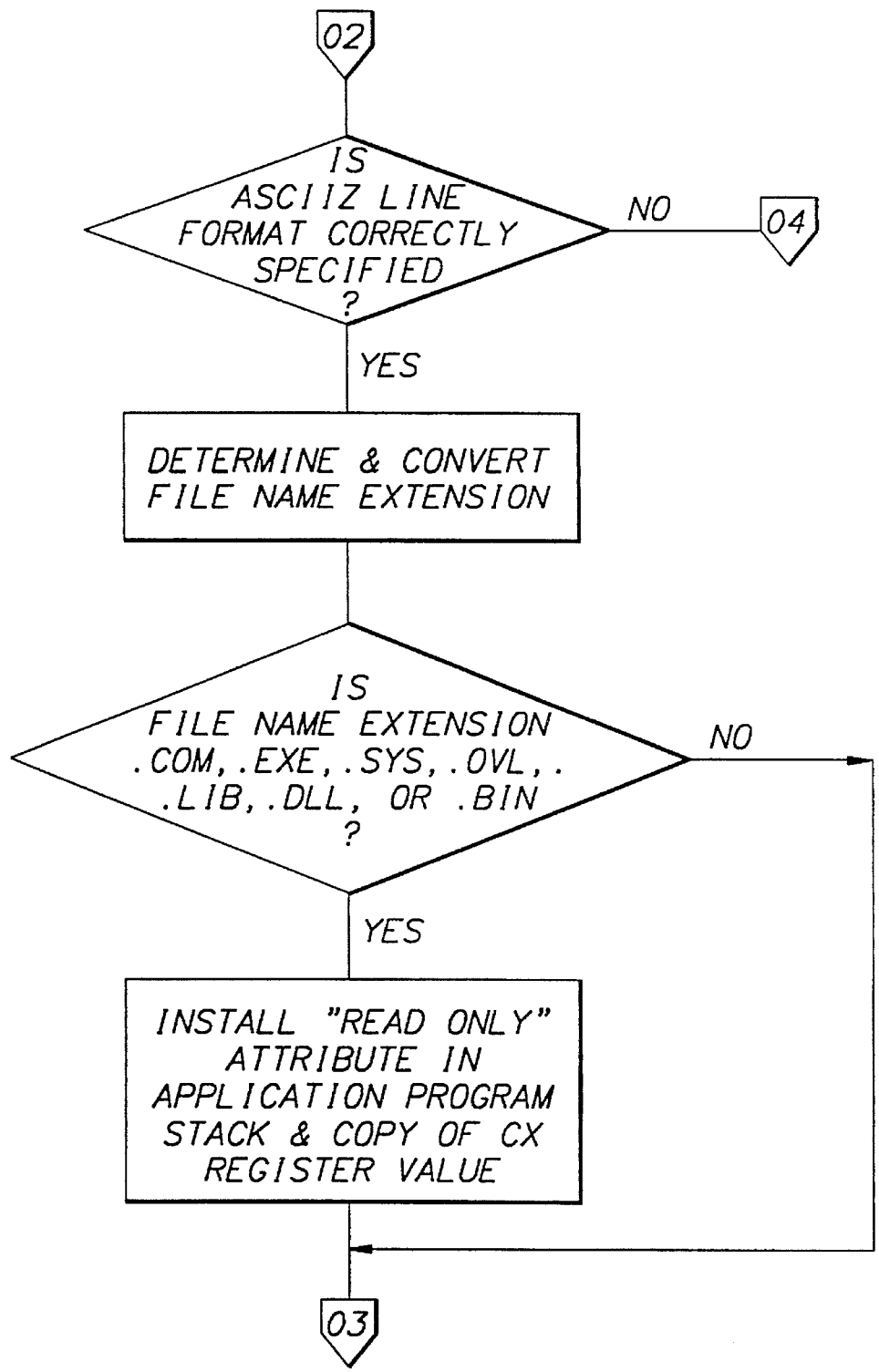
Figure 13D:
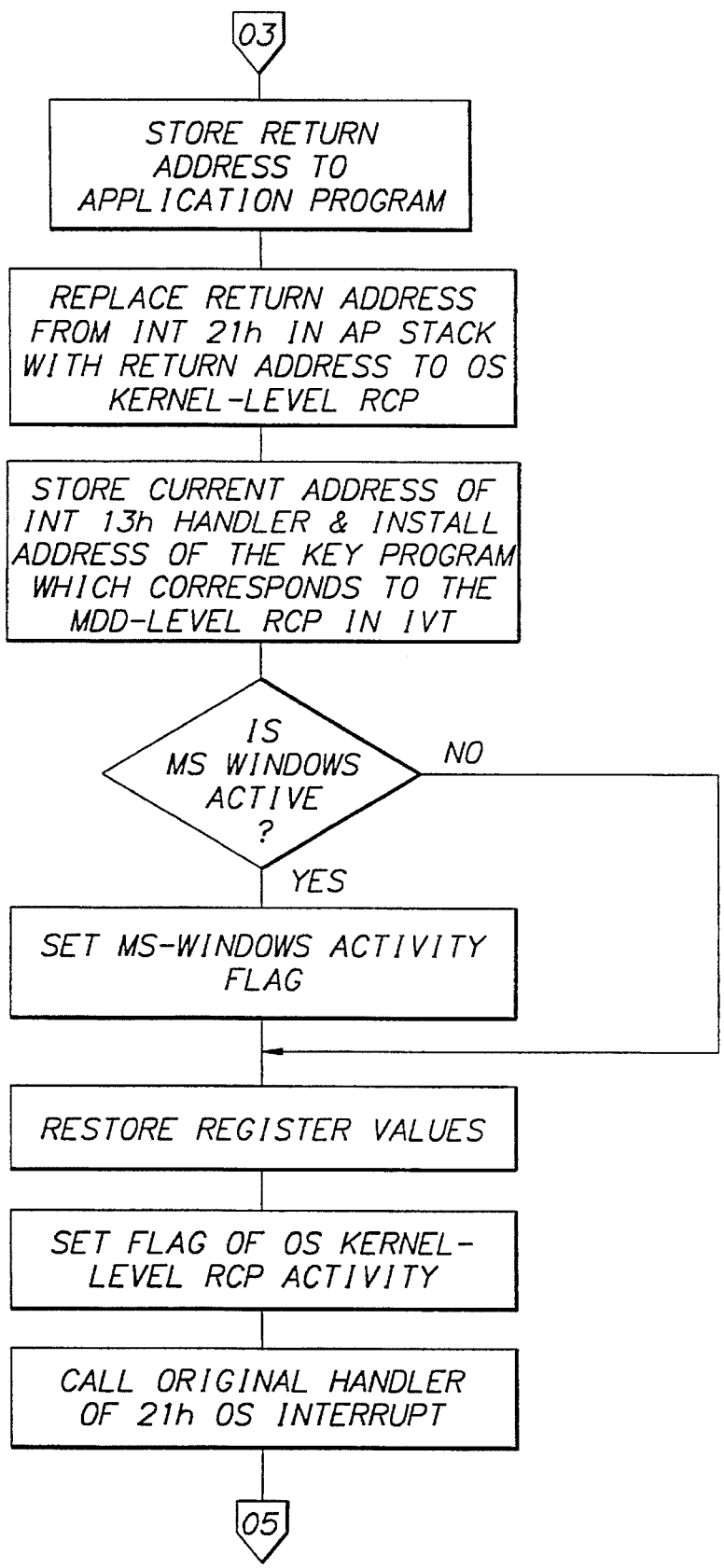
Figure 13E:
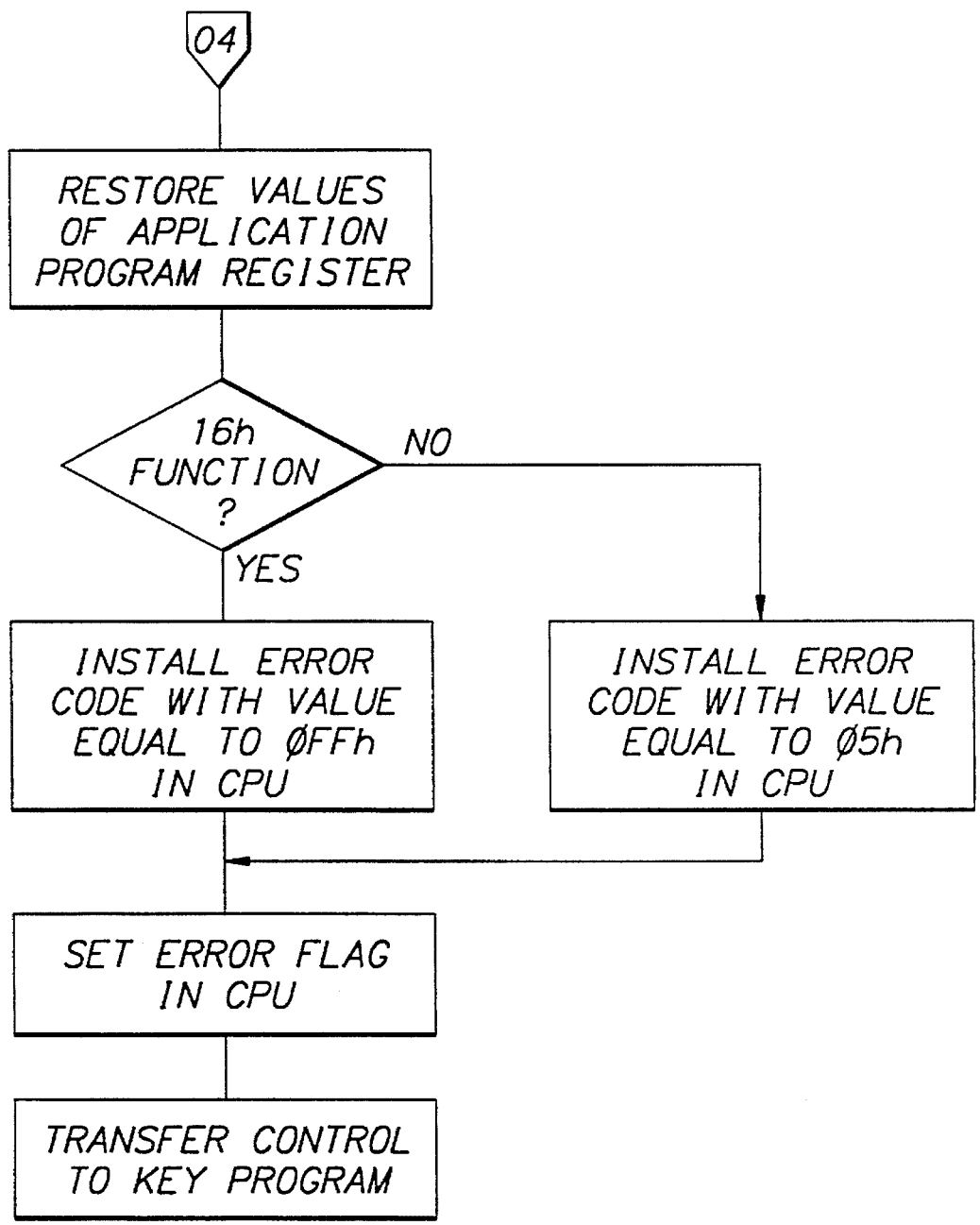
Figure 13F:
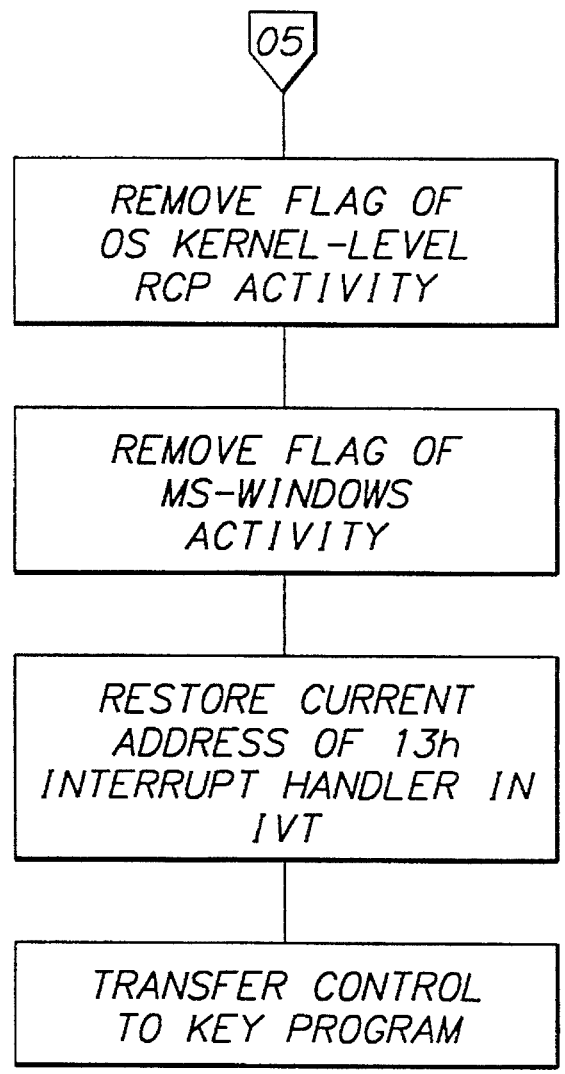

The OS kernel-level request check program 139 checks for a match between the current request and the set of dangerous requests at the OS 24 kernel level and prevents the servicing of dangerous requests by returning control to its corresponding key program 138 and by setting an error flag in the CPU 56 (FIG. 13E). The dangerous requests include requests to change file attributes in the absence of a protection control program activity flag and requests to write a track on a logic device. All other requests are interpreted as safe. If the request is a safe request, then the OS kernel-level request check program 139 does not prevent servicing of the request and calls the original handler of the 21h OS interrupt; in the event of requests to create files with the extensions .EXE, .COM, .SYS, .OVL, .LIB, DLL, or .BIN, the check program ascribes the attribute "read only".

Figure 12B:
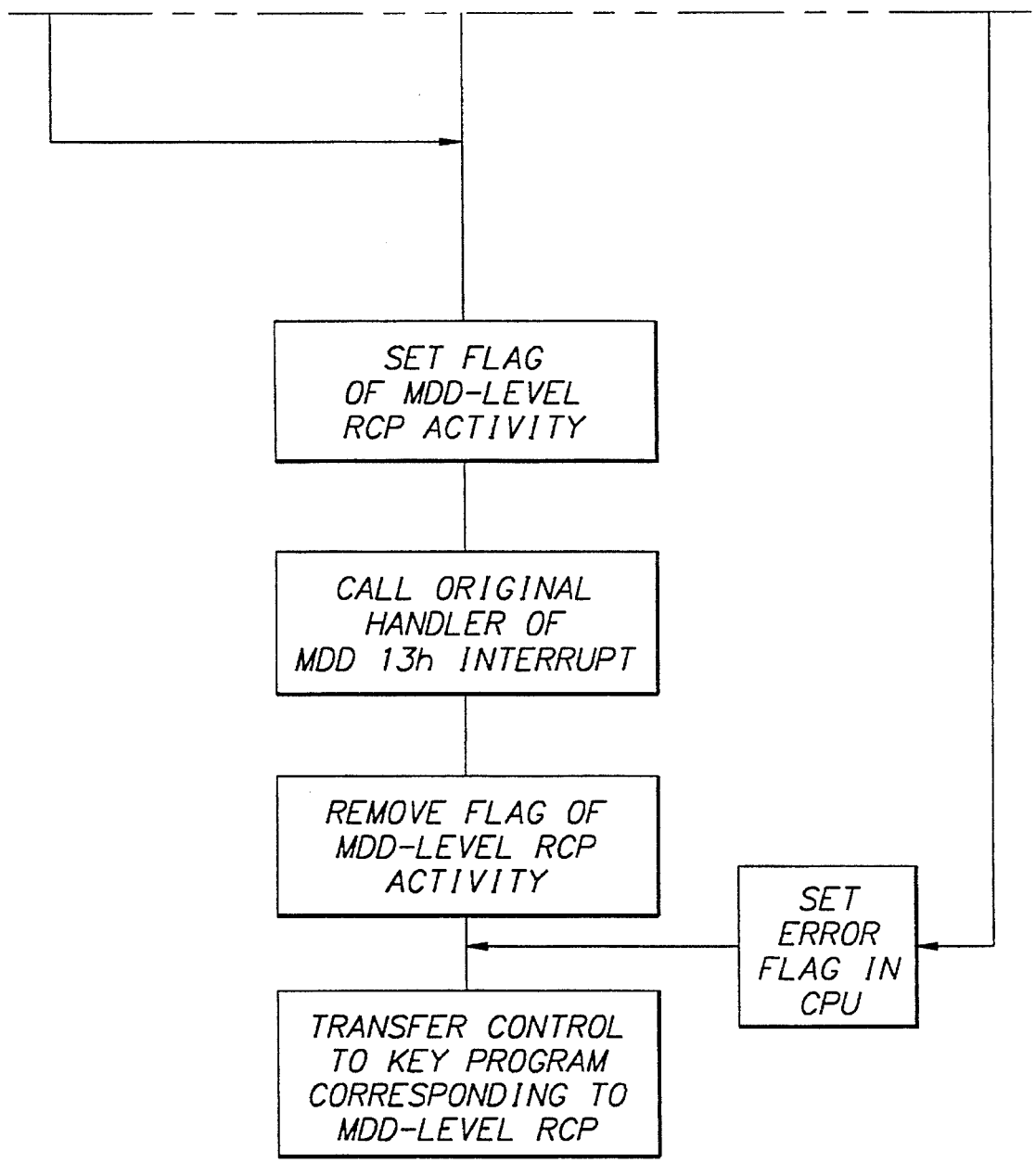

The modular device driver-level request check program 137 checks for a match between the current request and the set of dangerous requests at the modular device driver 26 level. Among the dangerous requests are hard disk 32 formatting requests. Other dangerous requests are write-requests which are not preceded by use of the OS 24, and write requests from sources other than the modular device driver 26. All other requests are interpreted as safe. If the request is one of the dangerous requests, the modular device driver-level request check program 137 prevents servicing of the request by returning control to its corresponding key program 136 and by setting an error flag in the CPU 56 (FIG. 12B). Otherwise, the modular device driver-level request check program 137 does not prevent servicing of the request and calls the original handler of the 13h modular device driver interrupt.

Figure 11B:
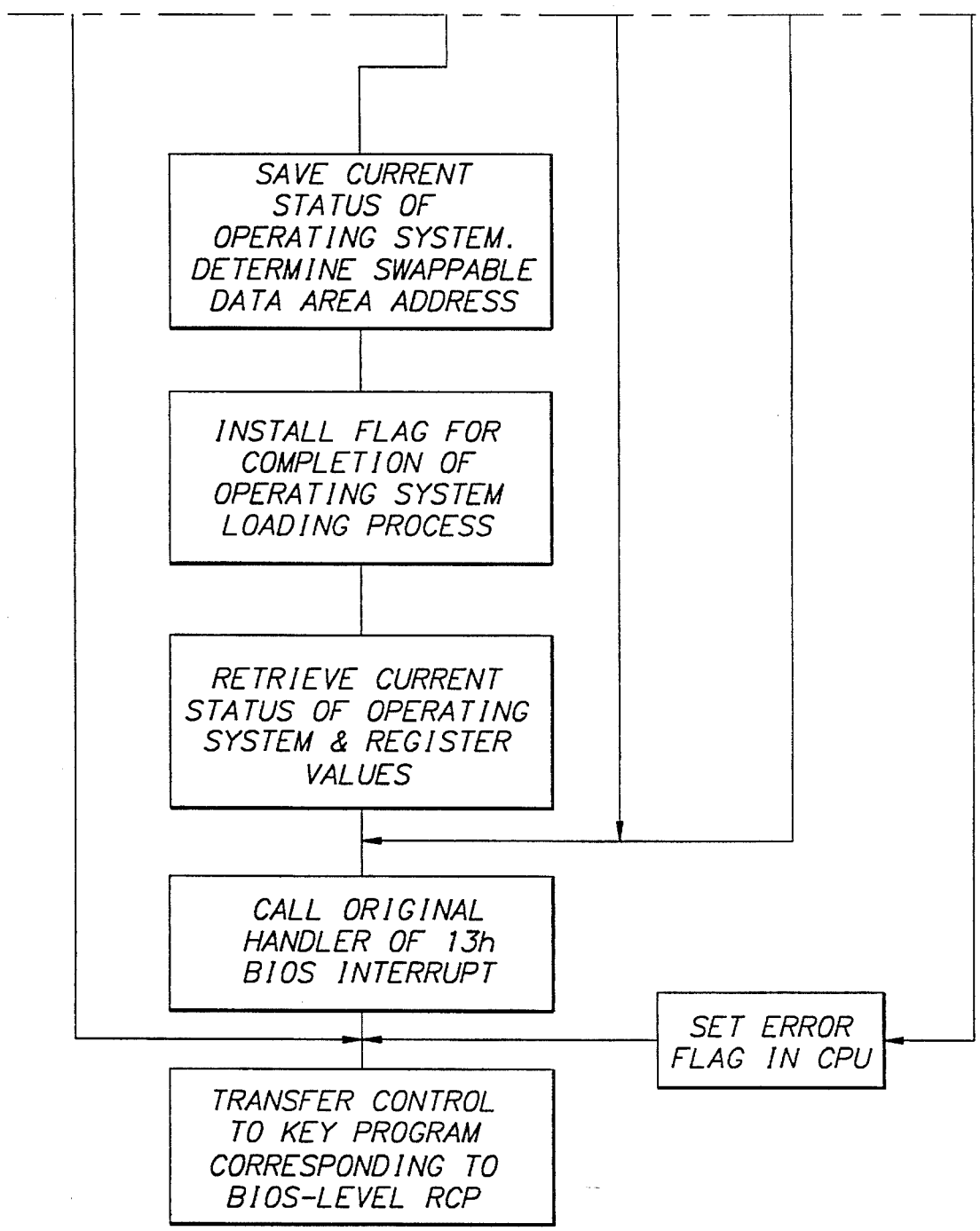

The BIOS-level request check program checks 135 for a match between the current request and the set of dangerous requests at the BIOS level. The dangerous requests include hard disk 32 formatting requests, write requests not preceded by use of the modular device driver 26, and write requests from sources other than the modular device driver 26. The BIOS-level request check program 135 prevents the servicing of dangerous requests by returning control to its corresponding key program 134 and by setting an error flag in the CPU 56 (FIG. 11B). If the request is safe, the BIOS-level request check program 135 calls the original handler of the 13h BIOS interrupt.

A detailed description of the configuration and the functional organization of the file protection subsystem is given below.

The protection initialization program is stored in the memory 124 and receives control from the BIOS ROM-Scan procedure before the OS kernel is loaded. The protection initialization program identifies the personal computer user and establishes a link between the BIOS-level request check program 135 and the original handler of the 13h BIOS interrupt. After control is transferred from the BIOS ROM-Scan procedure, the protection initialization program requests the password of the personal-computer user. After the password has been entered, the initialization program compares the signature of the password entered by the user with the password signature in the memory 124. If the signatures do not match, the protection initialization program outputs a message that the use of the personal computer is forbidden and stops the CPU 56. If the signatures match, the protection initialization program undertakes to establish a link between the BIOS-level request check program 135 and the original handler of the 13h BIOS interrupt.

The protection initialization program (FIG. 10) establishes a link between the BIOS-level request check program and the original handler of the 13h BIOS interrupt. To do this, the protection initialization program extracts from the interrupt vector table the address of the original handler of the 13h BIOS interrupt and places in the interrupt vector table the address of the key program in the memory 126, which corresponds to the BIOS-level request check program 135. The protection initialization program saves the address of the original handler of the 13h BIOS program interrupt in the memory 122, and the BIOS-level request check program uses the address to access the original handler of the 13h BIOS program interrupt. After the link is established, the initialization program transfers control to BIOS version 134 of the key program in the memory 126, which then switches the PPSM 120B into the active mode and returns control to the BIOS ROM-Scan procedure.

The BIOS-level request check program 135 is resident in the memory 122 and receives control from the corresponding version 134 of the key program. The key program 134 is resident in the memory 126, and switches the PPSM 120B into the passive mode (FIG. 14), after which it transfers control to the BIOS-level request check program 135. The BIOS-level request check program 135 performs the following functions:

when there is a request to read the partition table of the hard disk 32, the BIOS-level request check program 135 sets the flag of successful completion of the operation and transfers to the requesting program the contents of the original partition table of the hard disk 32. The original partition table of the hard disk 32 is stored in the memory 122;

monitors the process of loading the OS, and after it is completed establishes a link between the modular device driver-level request check program 137 and the original handler of the 13h modular device driver interrupt; and when the personal computer is in use, the BIOS-level request check program 135 monitors and prevents the servicing of dangerous requests, then the OS 24 is being loaded, the BIOS-level request check program 135 identifies read requests using the 02h, 0Ah, or 0Eh functions of the 13h BIOS interrupt. The BIOS-level request check program checks 135 for the presence of two OS loading completed flags. The first OS 24 loading completed flag is the placement of the address of the original handler of the 21h interrupt in the interrupt vector table. The second OS 24 loading completed flag is the OS 24 initialization completed flag, which is returned by the 1200h function of the 2Fh OS program interrupt. In the absence of these OS 24 loading completed flags, the BIOS-level request check program 135 calls the original handler of the 13h BIOS interrupt.

If the OS 24 loading completed flags are present, the BIOS-level request check program 135 places in the interrupt vector table the address of the modular device driver-level request check program 137 and stores the address of the original handler of the 13h modular device driver interrupt in the memory 124. Then the BIOS-level request check program 135 copies the data determining the current state of the OS 24 into a free area of the personal-computer memory, and, using the 5D06h function of the 21h OS interrupt, determines the address of the swappable data area (SDA). After the address of said area is determined, the BIOS-level request check program 135 sets an OS 24 loading completed flag and restores the current OS 24 state using the copy of the data determining the current OS 24 state.

While the personal computer is in use, the BIOS-level request check program 135 establishes a link with the modular device driver 26 and prevents the servicing of dangerous requests. When a hard disk 32 formatting request is identified, the check program 135 prevents the servicing of the request by returning control to its corresponding key program 134 (which in turn returns control to the calling program, FIG. 14) and by setting an error flag in the CPU 56 (FIG. 11B). When a write request is identified, the check program 135 checks the path used to access the hard disk controller 30. If the flag of modular device driver request check program 137 activity is not set and if the request source is not the modular device driver 26, the check program 135 prevents the servicing of the request and returns control to the corresponding key program 134 (which in turn returns control to the calling program) and by setting an error flag in the CPU 56.

For the servicing of requests, the BIOS-level request check program 135 sets its own activity flag and calls the original handler of the 13h BIOS program interrupt. After the request is serviced and control is returned to the BIOS level request check program 135, the program 135 removes its own activity flag and transfers control to its version 134 of the key program in the memory 126, which in turn switches the PPSM 120B into the active mode and returns control to the program requesting servicing at the corresponding level.

The modular device driver-level request check program 137 is resident in the memory 122 and receives control from the corresponding version 136 of the key program. The key program 136 is resident in the memory 126 and switches the PPSM 120B into the passive mode, after which it transfers control to the modular device driver-level request check program 137. The modular device driver-level request check program 137 identifies hard disk 32 formatting requests and prevents servicing of the request by returning control to its corresponding key program 136 (which in turn returns control to the calling program) and by setting an error flag in the CPU 56 (FIG. 12B). When a write request is identified, the check program 137 checks the path used to access the hard disk controller 30. If the flag of OS kernel-level request check program 139 activity is not present, the check program 137 prevents the servicing of the request and returns control to the corresponding key program 136 (which in turn returns control to the calling program) and sets an error flag in the CPU 56. In addition, the modular device driver level request check program 137 prevents the servicing of requests from sources other than the modular device driver 137 or the MS-WINDOWS operating environment.

For the servicing of requests, the modular device driver-level request check program 137 sets a flag of its own activity and calls the original handler of the 13h modular device driver program interrupt. After the request is serviced and control is returned to the modular device driver-level request check program 137, the program 137 removes the flag of its own activity and transfers control to its version 136 of the key program in the memory 126, which in turn switches the PPSM 120B into the active mode and returns control to the program requesting servicing at the corresponding level.

The OS kernel-level request check program 139 is resident in the memory 122 and receives control from the corresponding version 138 of the key program. The key program 138 is resident in the memory 126 and switches the PPSM 120B into the passive mode, after which it transfers control to the OS kernel-level request check program 139. The OS kernel-level request check program 139 checks the number of the requested function of the 21h OS program interrupt and, if functions not related to accessing the disk-storage subsystem are identified, returns control to the original handler of the 21h OS program interrupt. For all other requests, the OS kernel-level request check program 139 copies the values of the registers used by the original handler of the 21h OS interrupt into the memory 122. Then the request check program 139 extracts from the swappable data area (SDA) the value of the application program stack indicator and copies the application program stack to the memory area used by the protection programs 120A. After the stack copy is made, the OS kernel-level request check program 139 checks the number of the requested function and identifies the 16h, 3Ch, 6Ch, 4301h, or 440Dh function of the 21h OS interrupt, each of these functions involving a separate protection procedure. If the number of the requested function is not linked with any of the protection procedures, the OS kernel-level request check program 139 services the request immediately.

For the 16h function of the 21h OS interrupt, the OS kernel-level request check program 139 determines the format of the file control block (FCB). If the FCB has an extended format, the check program 139 determines the extension of the file being created. For files with extensions of .EXE, .COM, .SYS, .OVL, LIB, .DLL, or BIN, the OS kernel-level request check program ascribes the attribute "Read only" by modifying the file attribute field in the FCB.

For the 3Ch and 6Ch functions, the OS kernel-level request check program 139 checks the format of the ASCIIZ line indicated in the call of said functions. If the ASCIIZ line format is not correct, i.e., the ASCIIZ line does not contain a final zero, then the OS kernel-level request check program 139 returns control to the corresponding key program 138 (which in turn returns control to the program creating the file) and sets an error flag in the CPU 56 and installs the error code "Access Denied" (FIG. 13E). If the ASCIIZ line format is correct, the program 139 determines the extension of the file being created. For files with extensions of .EXE, .COM, .SYS, .OVL, .LIB, .DLL, or .BIN, the OS kernel-level request check program 139 places the attribute "Read Only" in the application protection stack storing the value of the CX register. In addition, the OS kernel-level request check program 139 places said attribute in the copy of the value of the CX register used by the original handler of the 21h OS interrupt.

For the 4301h function, the OS kernel-level request check program 139 checks for the activity flag of the protection control program having the privilege of changing file attributes. If the activity flag of the protection control program is absent, the OS kernel-level request check program 139 prevents the servicing of the request by transferring control to the corresponding key program 138 (which in turn returns control to the program requesting the change in file attributes) and sets an error flag in the CPU 56 and installs the error code "Access Denied" (FIG. 13E).

For the 440Dh function, the OS kernel-level request check program 139 identifies a request to write a track on a logic device that is a prototype of the hard disk 32, and prevents servicing of the request by transferring control to the corresponding key program 138 (which in turn returns control to the program requesting to write a track) and sets an error flag in the CPU 56 and installs the error code "Access Denied" (FIG. 13E).

Requests from the OS kernel-level request check program 139 are serviced by changing the return address from the original handler of the 21h interrupt in the application program stack. The initial return address to the application program from the 21h interrupt is stored in the memory 122, and the return address to the OS kernel-level request check program 139 is installed in the application program stack. Then the OS kernel-level request check program 139 stores the address of the current handler of the 13h modular device driver interrupt in the memory 122 used by the protection programs 120A and installs the address of the modular device driver-level request check program 137 in the interrupt vector table. After the current address of the 13h interrupt handler is changed in the interrupt vector table, the OS kernel-level request check program 139 uses the 1600h function of the 2Fh program interrupt to check for activity of the MS-Windows operating environment. If the value returned to the AX register is not 1600h, the check program 139 sets the MS-Windows activity flag. Then the OS kernel-level request check program 139 restores the register values based on the copy of the register values used by the original handler of the 21h OS interrupt, sets its own activity flag, and returns control to the original handler of the 21h program interrupt. After the request is serviced by the original handler of the 21h OS program interrupt and control is returned to the OS kernel-level request check program 139, the request check program 139 removes its own activity flag and the activity flag of the Windows operating environment and restores the current address of the 13h modular device driver interrupt handler. Then the OS kernel-level request check program 139 transfers control to its version 136 of the key program in the memory 126, which in turn switches the PPSM 120B into the active mode and transfers control to the application program 22.

The protection control program is stored on the hard disk 32 as an ordinary file. The purpose of the protection control program is to change file attributes and the personal-computer user password. It is the only application program having the privilege of changing the status of files or the user password. An example of a protection control program is given in FIG. 17. In order to use the privilege of changing file status or the user password, the protection control program sets its own activity flag at the 4301h function of the 21h OS interrupt. A special interface known to the OS kernel level request check program 139 is used to set the activity flag of the protection control program. The protection control program initializes the registers with certain values, while the OS kernel-level request check program 139 handles the above-mentioned function and performs the necessary actions, depending on the specific request of the protection control program.

The operation of the hardware on the PPSM 120B will now be discussed. As stated earlier, the PPSM 120B comprises a first memory 122, an address decoder 124, a second memory 126, a program discriminator 128, a programmable controller 130, and an AND gate 132. Each of these (except for the AND gate 132) is connected to the computer's address bus 50, data bus 52 and control bus 54, accordingly.

Figure 15:
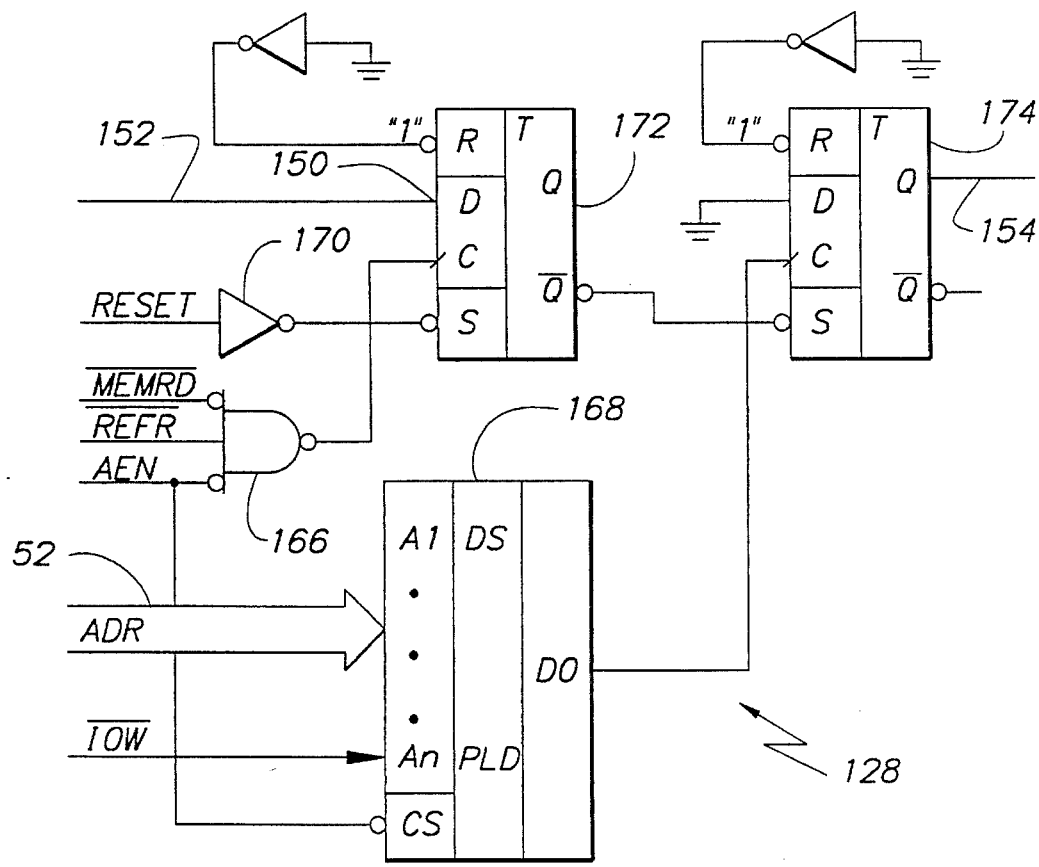
FIG. 15 is a functional block diagram of the program discriminator.

The program discriminator 128 (FIG. 15) comprises an AND gate 166, a control-port decoder 168, an inverter 170, and two D-type flip-flops 172 and 174. The programmable controller 130 (FIG. 16) comprises a port decoder 176, a mode register 178, and a buffer 180.

The PPSM 120B is reset by the RESET signal (FIGS. 15 and 16) from the system reset line. In particular, the RESET signal is transmitted to the input of the inverter 170 (FIG. 15), the output of which is connected to the S-input of the D-type flip-flop 172 of the program discriminator 128; the RESET signal is also transmitted to the R-input of the mode register 178 (FIG. 16) of the programmable controller 130. The RESET signal to the inverter 170 sets the flip-flop 172, which in turn generates a low level logic signal from the inverted output $\overline{Q}$ of the flip-flop 172. This low level logic signal from the inverted output $\overline{Q}$ sets the S-input of the D-type flip-flop 174 which in turn generates a high level logic signal from direct output Q of the flip-flop 174. This high-level logic signal at the direct output Q of the flip-flop 154 of the program discriminator 128 is transmitted through line 154 to the programmable controller 130, thereby permitting installation of data input into the mode register 178 of the programmable controller 130.

Figure 16:
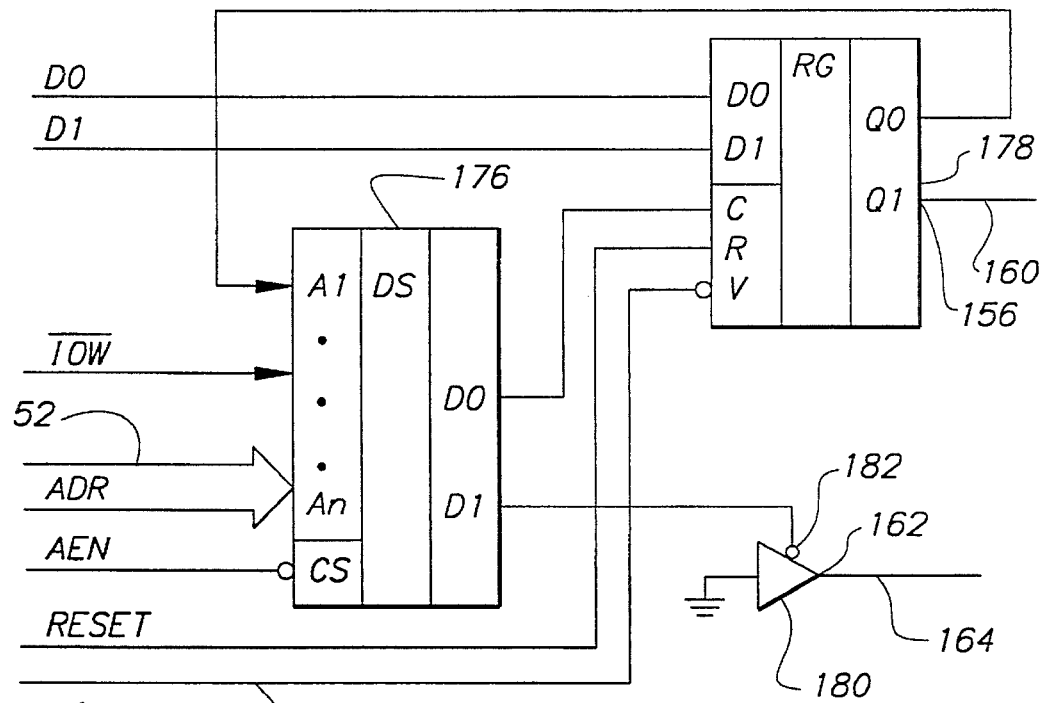
FIG. 16 is a functional block diagram of the programmable controller.

As shown in FIG. 16, the system-RESET signal feeds into the R-input of the mode register 178 which resets the register 178, thereby causing the Q0 output of the mode register 178 to send a low-level logic signal to the A1 of the port decoder 176. At the Q1 output (memory access control output 156 of the programmable controller 130) of the mode register 178 there is also a low-level logic signal, which is sent through line 160 to the second input 158 of the AND gate 132. The low-level logic signal on line 160 enables the second input 158 of the AND gate 132, thereby permitting the transmission of select signals for the first memory 122 as requested by the address decoder 124 via line 140. The output 144 of AND gate 132 is thereby connected to the select input 146 of the first memory 122; i.e., the first memory 122 becomes accessible to the CPU 56.

With the above-described combination of signals at the port-decoder 176 inputs, a high-level logic signal is present at the second output (D1) of the decoder 176 and is sent to the input of the control input 182 of buffer 180. This high-level signal at the control input 182 causes the output 162 of the buffer 180 to convert to a high impedance state which does not affect the state of the system ready line.

Thus, the initial state of the PPSM 120B is the neutral state, and the first memory 122 is read-accessible. In this regard, it should be noted that the RESET signal causes the CPU 56 to determine the personal-computer configuration and transfer control to programs resident in the external-device ROM. Since the first memory 122 of the PPSM 120B occupies the region of address space reserved for the external-device ROM, the protection programs 120A receive control before the OS 24 is loaded. As a result, the protection programs 120A can switch the PPSM 120B into the required state before the personal computer is in the ready state. In particular, the protection programs 120A can switch the PPSM 120B into the working state after the OS 24 is loaded. In addition, the protection programs 120A can prevent access to the first memory 122 and can be hidden from the applications software 22 and the OS 24.

In order to change the state of the PPSM 120B, the CPU 56 must enter the code for the desired state into the mode register 178 of the programmable controller 130. The protection programs 120A change the state of the PPSM 120B using a corresponding version of the key program stored in the second memory 126. During the extraction of key program codes, the second output of the address decoder 124 produces a low-level logic signal, which is sent through line 152 to the select input 148 of the second memory 126. This signal also is transmitted to the control input 150 of the program discriminator 128. The other inputs of the program discriminator 128, which are connected to the system control lines 54, receive signals specifying the type of bus cycle.

In particular, the $\overline{\text{MEMRD}}$ input (FIG. 15) of the AND gate 166 receives pulsed signals which specify the read-memory bus cycles. If the $\overline{\text{REFR}}$ (refresh) input and AEN (address enable) input to the AND gate 166 do not comprise signals used for memory restoration and direct access to memory, then the output of the AND gate 166 will produce pulsed signals which travel to the C-input of the flip-flop 172 and which latch the state of line 152. If there is a low-level logic signal at the D-input (i.e., at control input 150 of program discriminator 128) of the flip-flop 172, then each signal arriving at the C-input of the flip-flop 172 will produce at the inverse output $\overline{Q}$ of the flip-flop 172 a high-level signal which enables the operation of the flip-flop 174. If in that case, an active signal ($\overline{\text{IOW}}$) arrives at the control port decoder 168 from the system output line and if the address at the other inputs of the decoder 162 is the address of the control port, then the output of the control-port decoder 162 will be a pulsed signal indicating key program activity. This signal causes the direct output Q of the flip-flop 174 to have a low-level signal which is sent through line 154 to the first control input (pin V of the mode register 178 (FIG. 16) of the programmable controller 130, and this input acts as the permit mode register 178 setup input.

If an active signal (i.e., a low-level signal is present on line 154) is present at the first control input of the programmable controller 130, the state of the mode register 178 can be changed if another active signal (i.e., low-level signal IOW) is present at the port decoder 176 from the system output line and if the other inputs to the decoder 176 have the address which is the address of the control port. If this combination of signals is present at the permit mode register 178 setup input and at the port decoder 176 inputs, then the first output D0 of the port decoder 176 will produce a pulsed signal which sets the given information code at the outputs of the mode register 178.

If the code preventing access to the first memory 122 is entered into the mode register 178 then the Q1 output (i.e., memory access control output 156) of the mode register 178 will produce a high-level signal, which is sent through line 160 to the second input 158 of the AND gate 132. When that high-level signal is present, the AND gate 132 blocks the transmission of the select signals for the first memory 122 from the address decoder 124, as discussed earlier. As a result, the first memory 122 becomes inaccessible to the CPU 56.

If the working-state code is entered into the mode register 178, then the first output Q0 (FIG. 15) of the mode register 178 will produce a high-level signal, which is sent to the first input A1 of the port decoder 176. The signal causes the port decoder 176 to verify the bus cycles for CPU 56 access to output devices. If the port decoder 176 receives an active signal from the system output line (i.e., IOW) and the address of the control register of the hard disk controller (not shown) is at the other inputs of the decoder 176, then the D1 output of the port decoder 176 produces a low-level signal which is sent to the control input 182 of the buffer 180. The low-level signal causes the output 162 of the buffer 180 to produce a low-level signal which is sent through line 164 to the system ready line. The low-level signal on the system ready line prevents the completion of the current bus cycle and any further use of the personal computer.

The PPSM 120B should be an external card to be inserted into an expansion slot of the personal computer, and the personal computer should have an ISA (Industrial Standard Architecture) bus. The module memories 122 and 126 should occupy the address space for the external-device ROM. The programmable controller 130 should be set for the address of the control register of the hard disk controller 30. With regard to hard disk controllers 30 which have an IDE (Integrated Drive Electronics) interface, the programmable controller 130 should be set to the hexadecimal address 177 or 1F7.

The protection programs 120A are written in macroassembler language and are resident in the ROM of the computer's peripheral devices; furthermore, the programs 120A is installed using the installation diskette supplied with the protection-program subsystem 120.

The protection programs 120A are designed to limit access to the personal computer and to prevent the unintentional distortion of information in the computer's disk storage. In addition, the protection programs 120A prevent the intrusion of programs known as computer viruses and prevents the intentional distortion of information in the disk storage of the personal computer. A personal computer equipped with the protection programs 120A become resistant to the effects of known and unknown viruses. However, a personal computer equipped with the protection programs 120A do not support applications which use direct access to the BIOS 28 or direct access to the hard disk controller 30.

Without further elaboration, the foregoing will so fully illustrate my invention that others may, by applying current or future knowledge, readily adopt the same for use under various conditions of service.

We claim:

1. A system of protecting data stored on the hard disk of a personal computer from inadvertent or intentional distortion, the personal computer having a central processing unit and memory, a hard disk controller having a command register, a hard disk having sectors and a master boot record, and address bus, a data bus, a control bus, and peripheral devices coupled thereto, the memory comprising a basic input/output system, a modular device driver, an operating system kernel, an application program and an interrupt vector table containing original interrupt handlers, said system comprising:

means for establishing a single access path to the hard disk controller from the application program;

said means for establishing only one access path comprises means for monitoring requests by the application program to the operating system kernel, the modular device driver and the basic input/output system;

said means for establishing only one access path further comprises a programmable restriction module that permits the servicing of only those requests that utilize the operating system kernel, the modular device driver and the basic input/output system while precluding the servicing of any other requests; and said programmable restriction module being coupled to the personal computer address, data and control busses and being operatable in a passive mode thereby allowing servicing of those requests utilizing the operating system kernal, the modular device driver, and the basic input output system or being operatable in an active mode thereby preventing the servicing of any other requests.

2. The system of claim 1 wherein said programmable restriction module comprises means for monitoring the bus cycles involving access by the central processing unit to peripheral devices whenever said module is in said active mode.

3. The system of claim 2 wherein said programmable restriction module comprises means for producing a blocking signal in the bus cycle of data output to the command register of the hard disk controller whenever said module is operating in said active mode and an attempt is made to access the hard disk controller.

4. The system of claim 1 wherein said means for monitoring requests by the application program controls said passive or active mode of said programmable restriction module.

5. The system of claim 4 wherein said means for monitoring requests by the application program comprises means for switching said module into said passive mode before computer control is transferred to the basic input/output system and for switching said module into said active mode after control is received from the basic input/output system.

6. The system of claim 5 wherein said means for monitoring requests by the application program further comprises means for requiring that both the basic input/output system and the operating system kernel must be used for access to the hard disk controller in order to write information onto the hard disk.

7. The system of claim 1 wherein said means for establishing only one access path further comprises means for initialization, said means for initialization being stored in the first sector of the hard disk while the master boot record is transferred from the first sector to the ninth sector, said means for initialization being the first program to receive control once the operating system is loaded.

8. The system of claim 4 wherein said means for monitoring requests by the application program further comprises a basic input/output system level request check program having an address in the memory on the hard disk, said basic input/output system level request check program comprises means for linking to the basic input/output system by replacing the address of the original handler of the 13h basic input/output interrupt used by the modular device driver with said address.

9. The system of claim 8 wherein said basic input/output system level request check program further comprises means for preventing the use of the basic input/output system to format the hard disk, said means for preventing the use of the basic input/output system to format the hard disk identifying formatting requests and preventing the servicing of the formatting requests by returning control with an error flag.

10. The system of claim 8 wherein said means for monitoring requests by the application program further comprises a modular device driver-level request check program having an address in the memory on the hard disk, said modular device driver-level request check program comprises means for linking to the modular device driver by replacing the address of the original handler of the 13h interrupt in the interrupt vector table with said address of said modular device driver-level request check program, said modular device driver-level request check program further comprises means for monitoring the use of the 13h modular device driver interrupt and for setting a modular device driver activity flag.

11. The system of claim 10 wherein said basic input/output system-level request check program comprises means for requiring the use of both the modular device driver and the basic input/output system to write information on the hard disk, said means for requiring the use of both the modular device driver and the basic input/output system verifies the presence of said modular device driver activity flag and prevents servicing of write requests in the absence of said flag by returning control with an error flag.

12. The system of claim 10 wherein said modular device driver-level request check program further comprises means for preventing the use of the modular device driver to format the hard disk, said means for preventing the use of the modular device driver to format the hard disk identifying formatting requests and preventing the servicing of formatting requests by returning control with an error flag.

13. The system of claim 8 wherein said means for monitoring requests by the application program further comprises an operating system kernel-level request check program having an address in the memory on the hard disk, said operating system kernel-level request check program comprises means for linking to the operating system kernel by removing from the operating system kernel the call of the 82h function of the 2Ah program interrupt and placing in the operating system kernel the call of said operating system kernel-level request check program, said operating system kernel-level request check program further comprises means for monitoring the use of the 21h operating system program interrupt and setting an operating system kernel activity flag.

14. The system of claim 13 wherein said modular device driver-level request check program further comprises means for requiring the use of both the operating system kernel and the modular device driver to write information on the hard disk, said means for requiring the use of both the operating system kernel and the modular device driver verifying the presence of said operating system kernel activity flag and preventing servicing of write requests in the absence of said flag by returning control with an error flag.

15. The system of claim 13 wherein said operating system kernel-level request check program further comprises means for preventing the use of the operating system kernel to write a track on a logic device that is a prototype of the hard disk and for preventing the servicing of requests to write a track on the logic device by returning control with an error flag.

16. The system of claim 13 wherein said operating system kernel-level request check program further comprises a means for changing the status of files created using the 16h function of the 21h operating system program interrupt and wherein the files have the extension .BIN, .COM, .DLL, .EXE, LIB, .OVL or .SYS, said means for changing the status of files created using the 16h function determining the extensions of such files and placing the attribute "READ ONLY" in the file control block.

17. The system of claim 13 wherein said operating system kernel-level request check program further comprises means for changing the status of files created using the 3Ch or 6Ch function of the 21h operating system program interrupt and wherein the files have the extension .BIN, .COM, .DLL, .EXE, LIB, .OVL, or .SYS, said means for changing the status of files created using the 3Ch or 6Ch function determining the extension of such files and placing the attribute "READ ONLY" in the stack of the program creating such files.

18. The system of claim 13 wherein said operating system kernel-level request check program further comprises means for monitoring the use of a protection control program having the privilege of using the operating system kernel to change the status of files, the protection control program being privileged to use the 4301h function of the 21h operating system program interrupt to change the attributes of a file and wherein the protection control program sets its own activity flag whenever there is a request to change the status of a file, the protection control program being enabled to use the 4301h function of the 21h operating system program interrupt by said operating system kernel-level request check program, said means for monitoring the use of the protection control program verifying the presence of the activity flag of the protection control program and for preventing the servicing of requests to change the status of files in the absence of the activity flag by returning control with an error flag.

19. A system of protecting data stored on the hard disk of a personal computer from inadvertent or intentional distortion, the personal computer having a central processing unit and memory, a hard disk controller having a command register, a hard disk, an address bus, a data bus, a control bus, and peripheral devices coupled thereto, the memory comprising a basic input/output system, a modular device driver, an operating system kernel, an application program and an interrupt vector table containing original interrupt handlers, said system comprising means for establishing a single access path to the hard disk controller from the application program;

said means for establishing only one access path comprises means for monitoring requests by the application program to the operating system kernel, the modular device driver and the basic input/output system;

said means for establishing only one access path further comprises a protection-program support module that permits the servicing of only those requests that utilize the operating system kernel, the modular device driver and the basic input/output system while precluding the servicing of any other requests and wherein said means for monitoring requests by the application program resides in a memory in said protection program support module; and said protection-program support module being coupled to the personal computer address, data and control busses and being operable in a neutral mode thereby allowing servicing of those requests utilizing the operating system kernal, the modular device driver, and the basic input output system or being operable in any other working mode thereby preventing the servicing of requests; and said protection-program support module comprising a first memory and a second memory, said first memory being inaccessible to the central processing unit and said second memory being accessible to the central processing unit.

20. The system of claim 19 wherein said protection program support module comprises means for monitoring the bus cycles involving access by the central processing unit to peripheral devices whenever said module is in said working mode.

21. The system of claim 20 wherein said protection program support module comprises means for producing a blocking signal in the bus cycle of data output to the command register of the hard disk controller whenever said module is operating in said working mode and an attempt is made to access the hard disk controller.

22. The system of claim 21 wherein said means for monitoring requests by the application program comprises a basic input/output system level request check program, a modular device driver level request check program and an operating system kernel-level request check program, said basic input/output system level request check program, said modular device driver request check program and said operating system kernel-level request check program residing in said first memory.

23. The system of claim 22 wherein means for monitoring requests by the application program further comprises key programs that reside in said second memory, said key programs comprise means for switching said protection program support module into said neutral or working mode.

24. The system of claim 23 wherein said basic input/output system level request check program comprises means for transferring control to or receiving control from a first key program having a first address in said second memory, said modular device driver level request check program comprises means for transferring control to or receiving control from a second key program having a second address in said second memory and said operating system kernel-level request check program comprises means for transferring control to or receiving control from a third key program having a third address in said second memory.

25. The system of claim 24 wherein said means for switching in said first key program switches said module into said neutral mode before computer control is transferred to the basic input/output system and for switching said module into said working mode after control is received from the basic input/output system.

26. The system of claim 25 wherein said means for monitoring requests by the application program further comprises means for requiring that both the basic input/output system and the operating system kernel must be used for access to the hard disk controller in order to write information on the hard disk.

27. The system of claim 26 wherein said basic input/output system level request check program further comprises means for linking to the basic input/output system by replacing the address of the original handler of the 13h basic input/output interrupt in the interrupt vector table with said first address of said first key program.

28. The system of claim 27 wherein said modular device driver-level request check program further comprises means for linking to the modular device driver by replacing the address of the original handler of the 13h basic input/output interrupt of the modular device driver with said second address of said second key program, said modular device driver-level request check program further comprises means for monitoring the use of the 13h modular device driver interrupt and setting a modular device driver activity flag.

29. The system of claim 28 wherein said operating system kernel-level request check program further comprises means for linking to the operating system kernel by removing from the operating system kernel the call of the 82h function of the 2Ah program interrupt and placing in the operating system kernel the call code for said third key program, said operating system kernel-level request check program further comprises means for monitoring the use of the 21h operating system program interrupt and setting an operating system kernel activity flag.

30. The system of claim 29 wherein said basic input/output system level request check program further comprises means for monitoring queries at the 13h interrupt of the basic input/output system, and queries including hard disk formatting requests and attempts at recording on the hard disk without the use of the basic input/output system.

31. The system of claim 30 wherein said basic input/output system level request check program further comprises means for preventing the use of the basic input/output system to format the hard disk, said means for preventing use of the basic input/output system to format the hard disk identifying formatting requests and preventing the servicing of the formatting requests by returning control with an error flag via said first key program.

32. The system of claim 31 wherein said basic input/output system-level request check program further comprises means for requiring the use of both the modular device driver and the basic input/output system to write information on the hard disk, said means for requiring the use of both the modular device driver and the basic input/output system verifying the presence of said modular device driver activity flag and preventing servicing of write requests in the absence of said flag by returning control with an error flag via said first key program.

33. The system of claim 32 wherein said modular device driver-level request check program further comprises means for preventing the use of the modular device driver to format the hard disk, said means for preventing the use of the modular device driver to format the hard disk identifying formatting requests and preventing the servicing of formatting requests by returning control with an error flag via said second key program.

34. The system of claim 33 wherein said modular device driver-level request check program further comprises means for requiring the use of both the operating system kernel and the modular device driver to write information on the hard disk, said means for requiring the use of both the operating system kernel and the modular device driver verifying the presence of said operating system kernel-level activity flag and preventing servicing of write requests in the absence of said flag by returning control with an error flag via said second key program.

35. The system of claim 29 wherein said operating system kernel-level request check program further comprises means for preventing the use of the operating system kernel to write a track on a logic device that is a prototype of the hard disk wherein said means for preventing denies servicing of requests to write a track on the logic device by returning control with an error flag via said third key program.

36. The system of claim 35 wherein said operating system kernel-level request check program further comprises means for changing the status of files created using the 16h function of the 21h operating system program interrupt and wherein the files have the extension .BIN, .COM, .DLL, .EXE, .LIB, .OVL or SYS, said means for changing the status of files created using the 16h function determining the extensions of such files and placing the attribute "READ ONLY" in the file control block.

37. The system of claim 36 wherein said operating system kernel-level request check program further comprises means for changing the status of files created using the 3Ch or 6Ch function of the 21h operating system program interrupt and wherein the files have the extension .BIN, .COM, .DLL, .EXE, LIB, .OVL, or .SYS, said means for changing the status of files created using the 3Ch or 6Ch function determining the extension of such files and placing the attribute "READ ONLY" in the stack of the program creating such files.

38. The system of claim 37 wherein said operating system kernel-level request check program further comprises means for monitoring the use of a protection control program having the privilege of using the operating system kernel to change the status of files, the protection control program being privileged to use the 4301h function of the 21h operating system program interrupt to change the attributes of a file and wherein the protection control program sets its own activity flag whenever there is a request to change the status of a file, the protection control program being enabled to use the 4301h function of the 21h OS program interrupt by said operating system kernel-level request check program, said means for monitoring the use of a protection control program verifying the presence of the activity flag of the protection control program and preventing the servicing of requests to change the status of files in the absence of the activity flag by returning control with an error flag via said third key 1716 program.

\* \* \* \* \*